(12) United States Patent
Homma et al.

(10) Patent No.: US 10,630,736 B2
(45) Date of Patent: Apr. 21, 2020

(54) INFORMATION PROCESSING APPARATUS, COMMUNICATION PLATFORM DETERMINING METHOD, TRANSMISSION SYSTEM, AND TRANSMISSION TERMINAL

(71) Applicant: RICOH COMPANY, LTD., Tokyo (JP)

(72) Inventors: Takeshi Homma, Kanagawa (JP); Tatsuya Nagase, Kanagawa (JP); Yoichiro Matsuno, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 193 days.

(21) Appl. No.: 15/548,002

(22) PCT Filed: Feb. 12, 2016

(86) PCT No.: PCT/JP2016/000728
§ 371 (c)(1),
(2) Date: Aug. 1, 2017

(87) PCT Pub. No.: WO2016/143260
PCT Pub. Date: Sep. 15, 2016

(65) Prior Publication Data
US 2018/0027030 A1  Jan. 25, 2018

(30) Foreign Application Priority Data

Mar. 11, 2015  (JP) .................. 2015-048223

(51) Int. Cl.
*H04L 29/06* (2006.01)
*H04L 12/18* (2006.01)
(Continued)

(52) U.S. Cl.
CPC ...... *H04L 65/1089* (2013.01); *H04L 12/1813* (2013.01); *H04L 12/1822* (2013.01);
(Continued)

(58) Field of Classification Search
None
See application file for complete search history.

(56) References Cited

U.S. PATENT DOCUMENTS 8,769,001 B2  7/2014  Ohwada
8,838,699 B2  9/2014  Barlow
(Continued)

FOREIGN PATENT DOCUMENTS

JP    4-246956 A    9/1992
JP    2006-066973    3/2006
(Continued)

OTHER PUBLICATIONS

International Search Report and Written Opinion dated May 10, 2016 in PCT/JP2016/000728 filed on Feb. 12, 2016.
(Continued)

*Primary Examiner* — Joshua Joo
(74) *Attorney, Agent, or Firm* — Xsensus LLP

(57) ABSTRACT

An information processing apparatus that interconnects a plurality of transmission terminals supporting a plurality of communication platforms is provided. The information processing apparatus includes a state detection unit configured to detect a communication state relating to at least one of a communication between the transmission terminals and a communication between at least one of the transmission terminals and the information processing apparatus; a read unit configured to read from a storage unit communication platform determination information associating the plurality of communication platforms with the communication state; and a determination unit configured to determine that a communication platform of the plurality of communication platforms that is registered in the communication platform determination information in association with the communication state that has been detected by the state detection unit is to be used in the communication between the transmission terminals.

11 Claims, 17 Drawing Sheets

(51) Int. Cl.
*H04N 7/15* (2006.01)
*H04M 3/56* (2006.01)
*H04L 29/08* (2006.01)
*H04M 3/22* (2006.01)

(52) U.S. Cl.
CPC ........ *H04L 12/1827* (2013.01); *H04L 65/403* (2013.01); *H04L 65/4015* (2013.01); *H04N 7/152* (2013.01); *H04L 65/1073* (2013.01); *H04L 67/02* (2013.01); *H04M 3/2227* (2013.01); *H04M 3/56* (2013.01)

(56) References Cited

U.S. PATENT DOCUMENTS

| | | | |
|---|---|---|---|
| 9,503,439 B2 | 11/2016 | Okuyama et al. | |
| 2005/0108088 A1* | 5/2005 | Suerbaum | H04W 28/16 705/12 |
| 2010/0182924 A1* | 7/2010 | Hong | H04B 7/18591 370/252 |
| 2012/0311176 A1* | 12/2012 | Dellinger | H04L 69/18 709/232 |
| 2013/0230057 A1 | 9/2013 | Hori et al. | |
| 2014/0324975 A1 | 10/2014 | Tamura | |
| 2015/0200826 A1* | 7/2015 | Assem | H04L 43/0829 370/252 |
| 2016/0134666 A1* | 5/2016 | Ethier | H04L 65/403 709/204 |

FOREIGN PATENT DOCUMENTS

| | | |
|---|---|---|
| JP | 2011-205612 | 10/2011 |
| JP | 2014-075074 | 4/2014 |
| JP | 2014-233068 | 12/2014 |
| WO | 2012/063417 A1 | 5/2012 |

OTHER PUBLICATIONS

Extended European Search Report dated Feb. 13, 2018 in Patent Application No. 16761239.9.

* cited by examiner

[Fig. 1A]
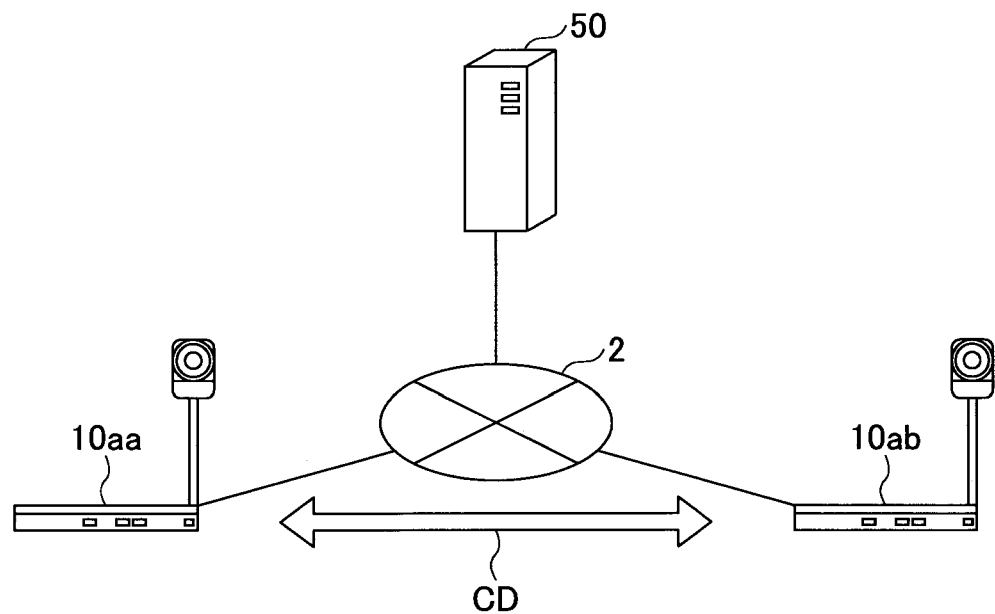
[Fig. 1B]
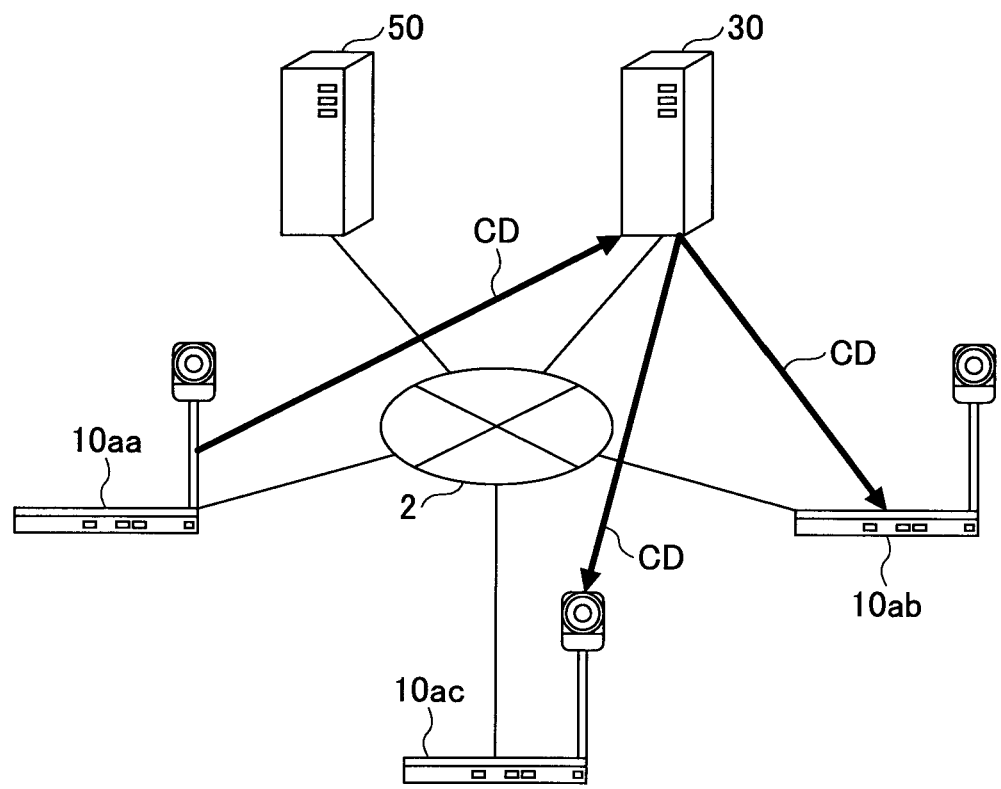

[Fig. 2]
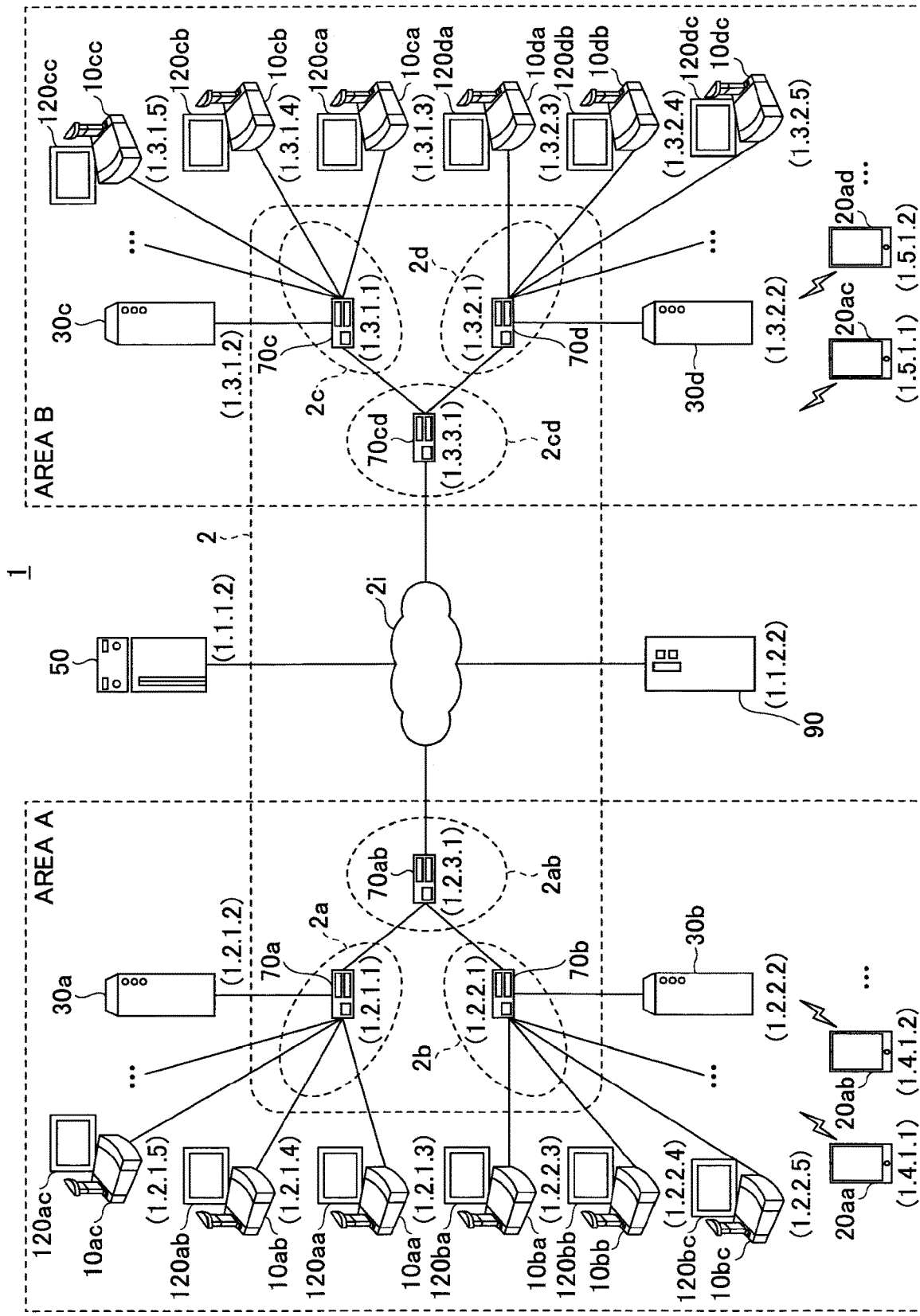

[Fig. 3]
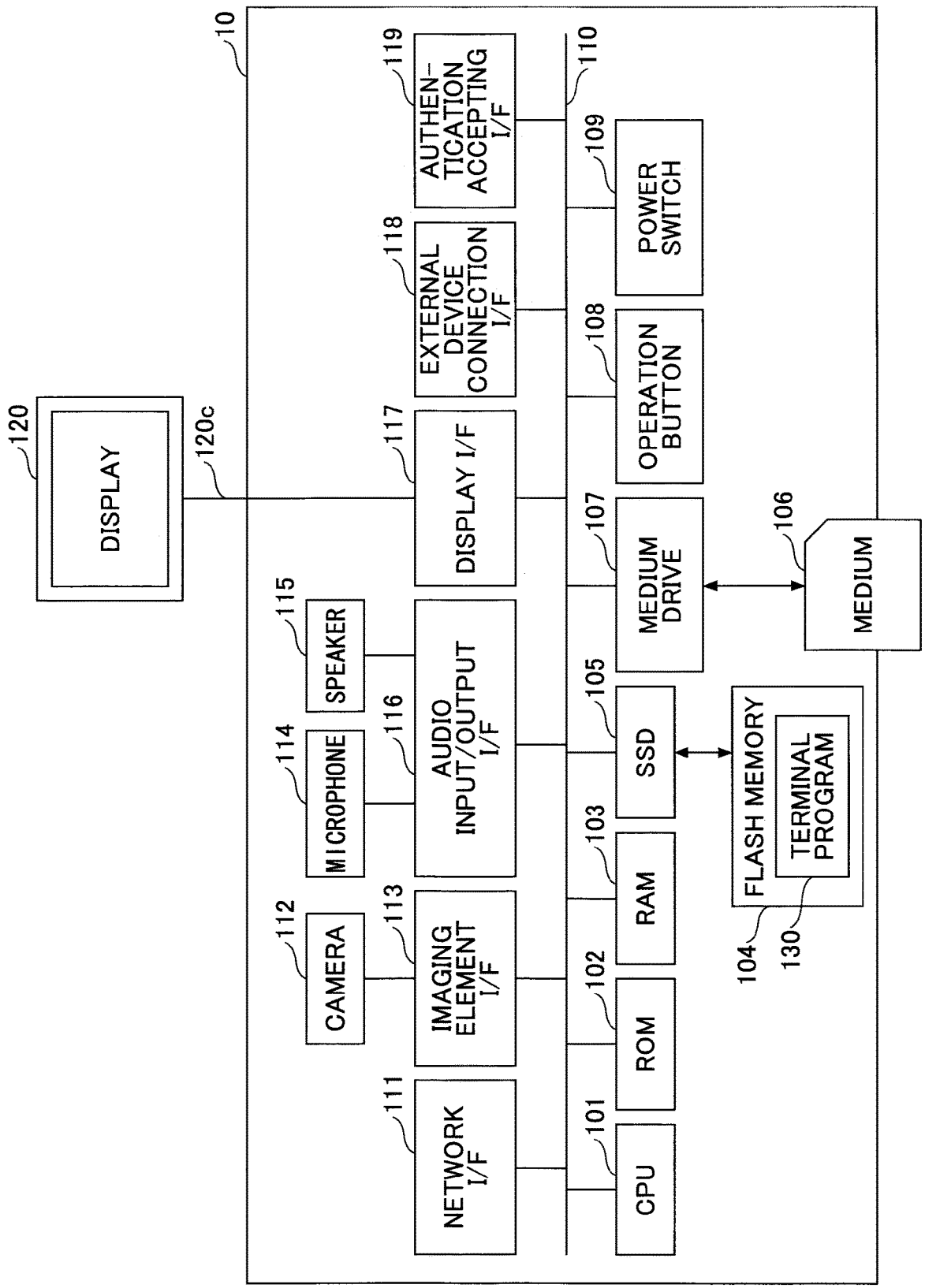

[Fig. 4]
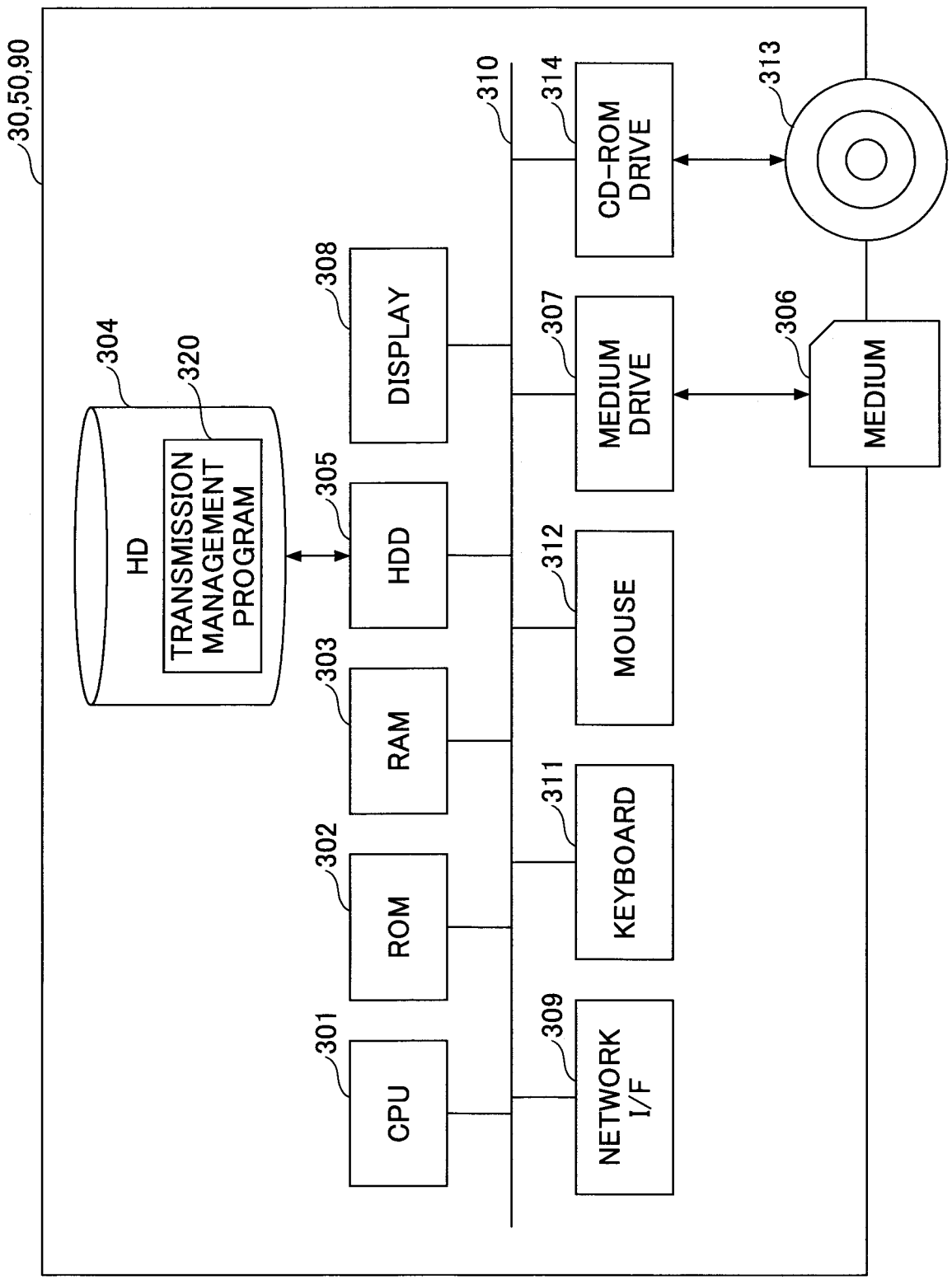

[Fig. 5]
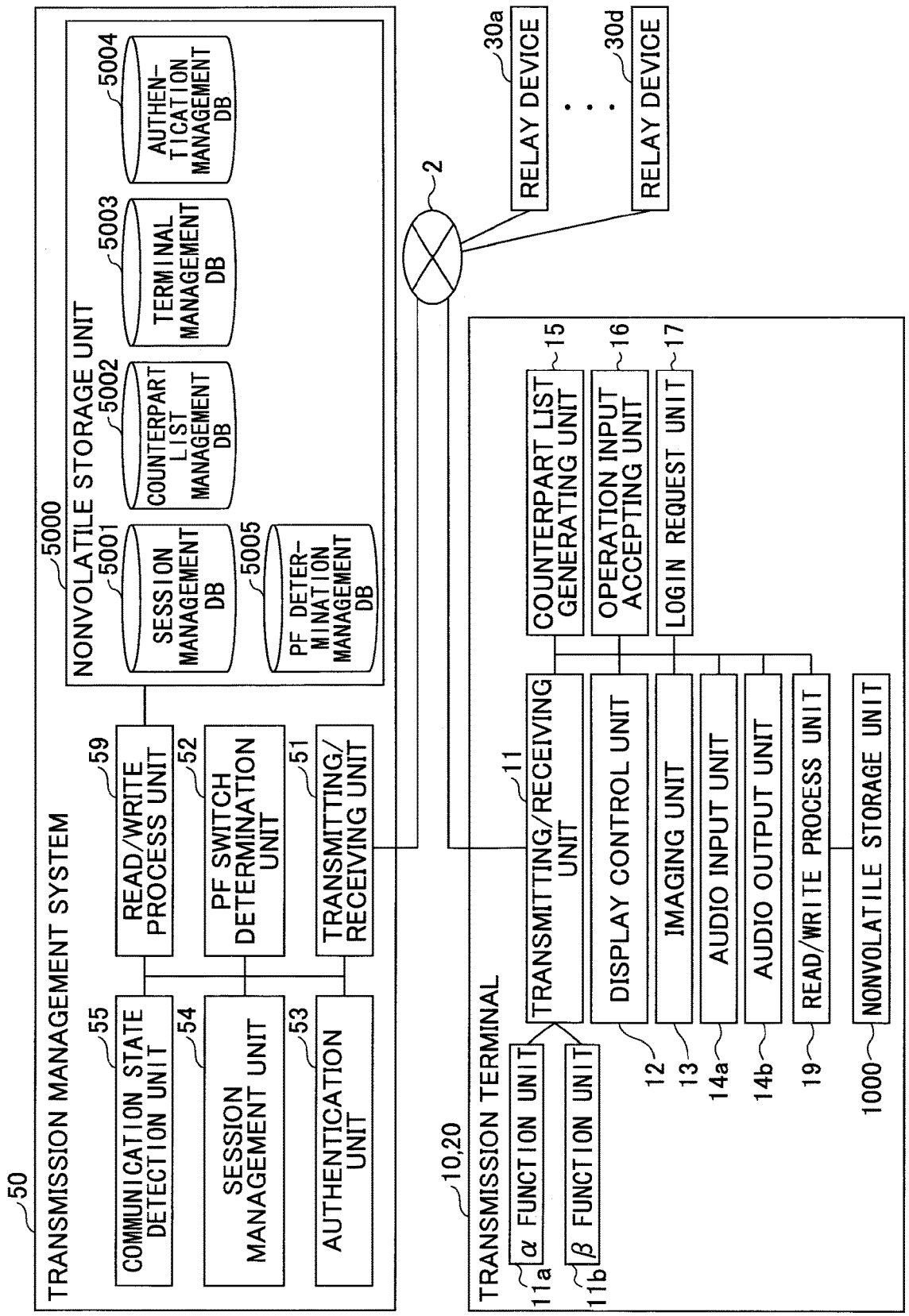

[Fig. 6]
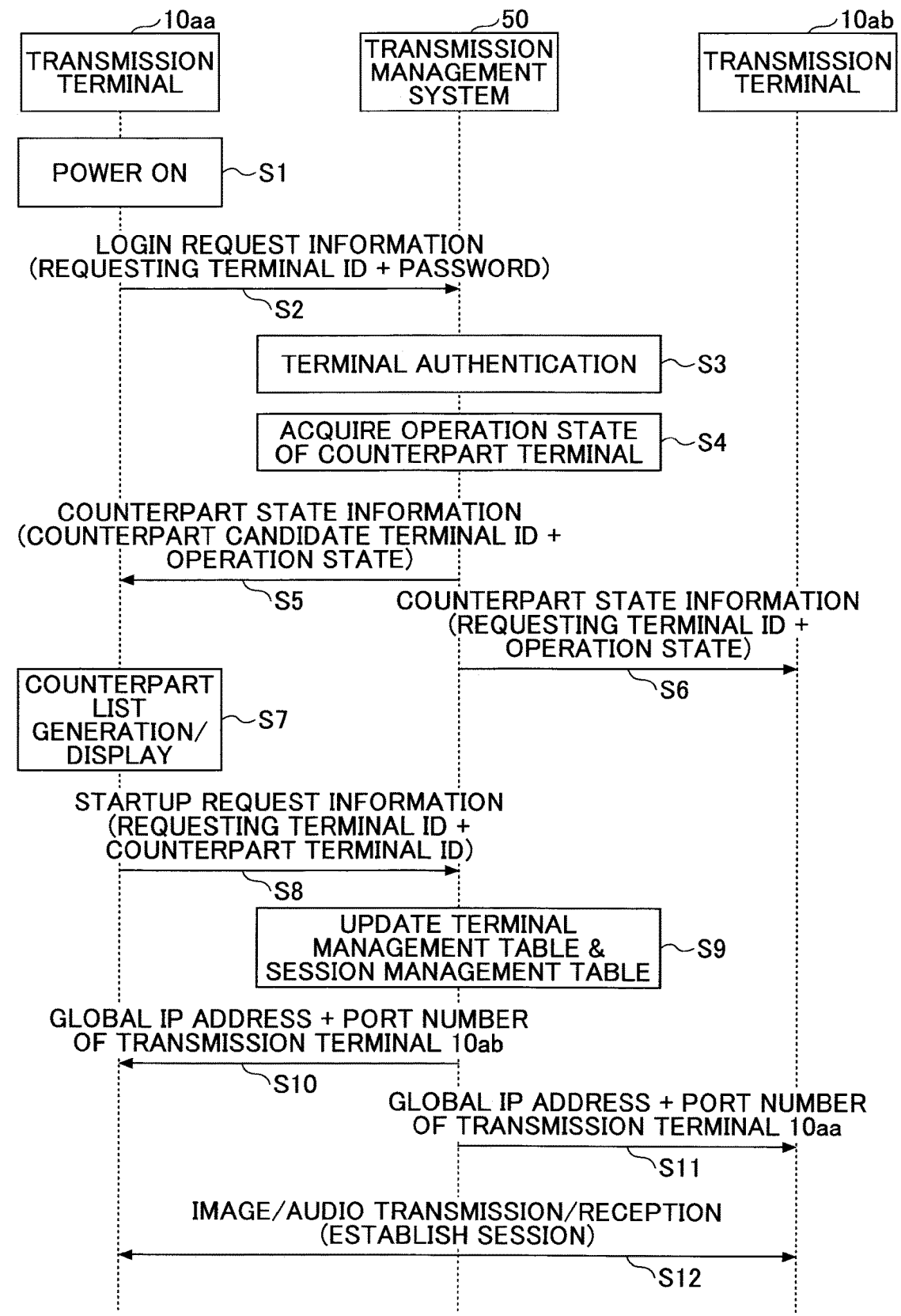

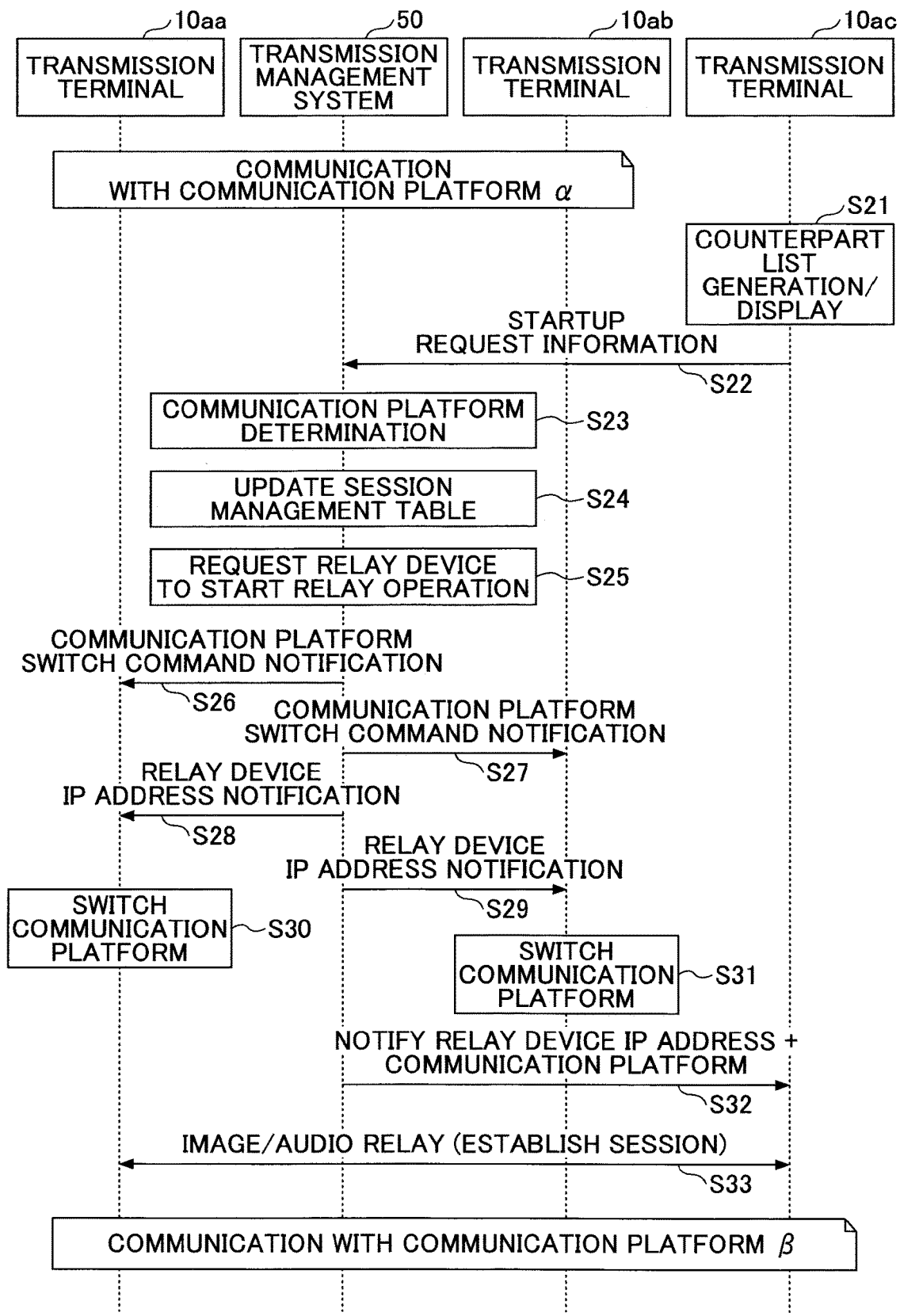
[Fig. 7]

[Fig. 8]
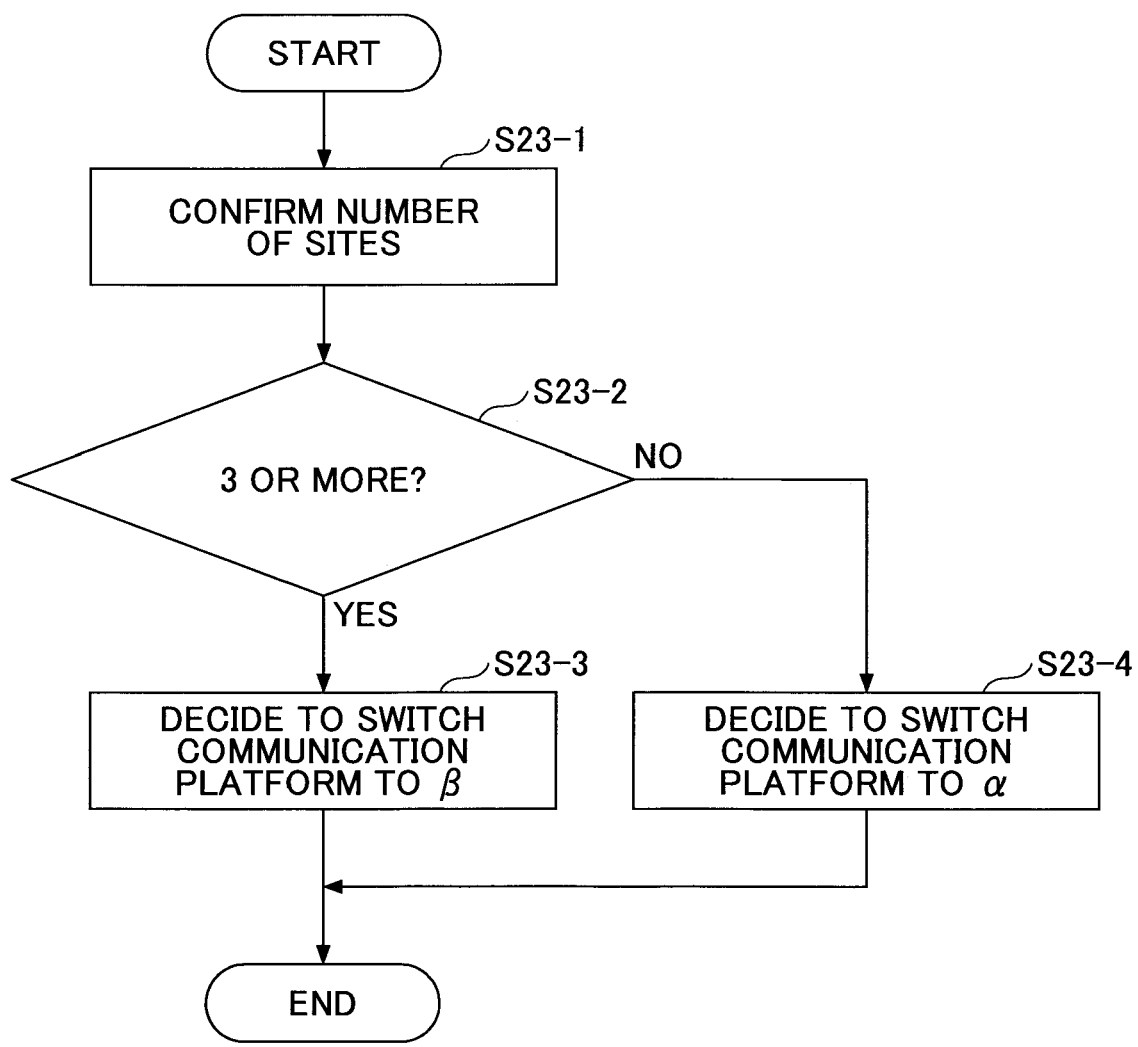

[Fig. 9]
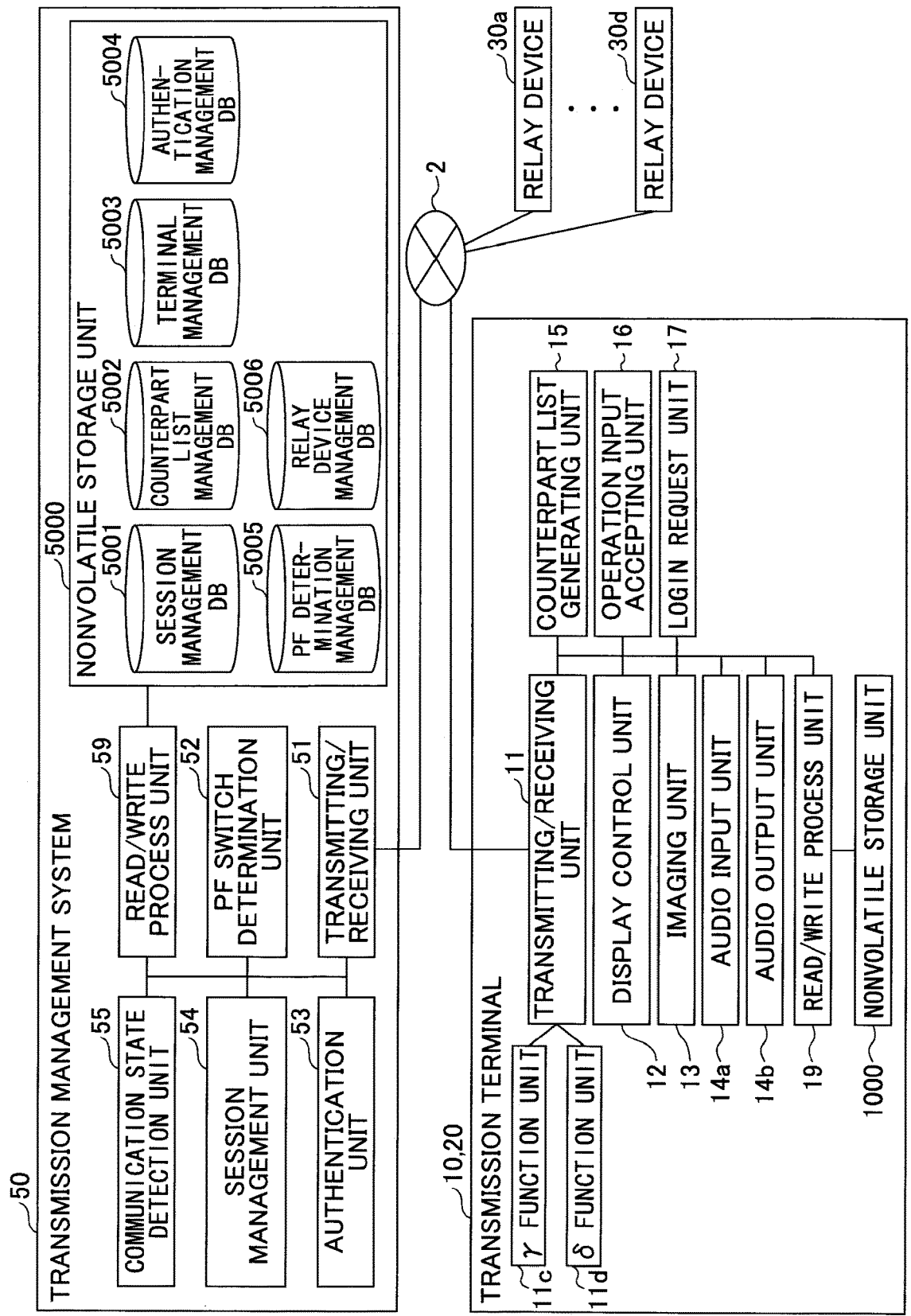

[Fig. 10]
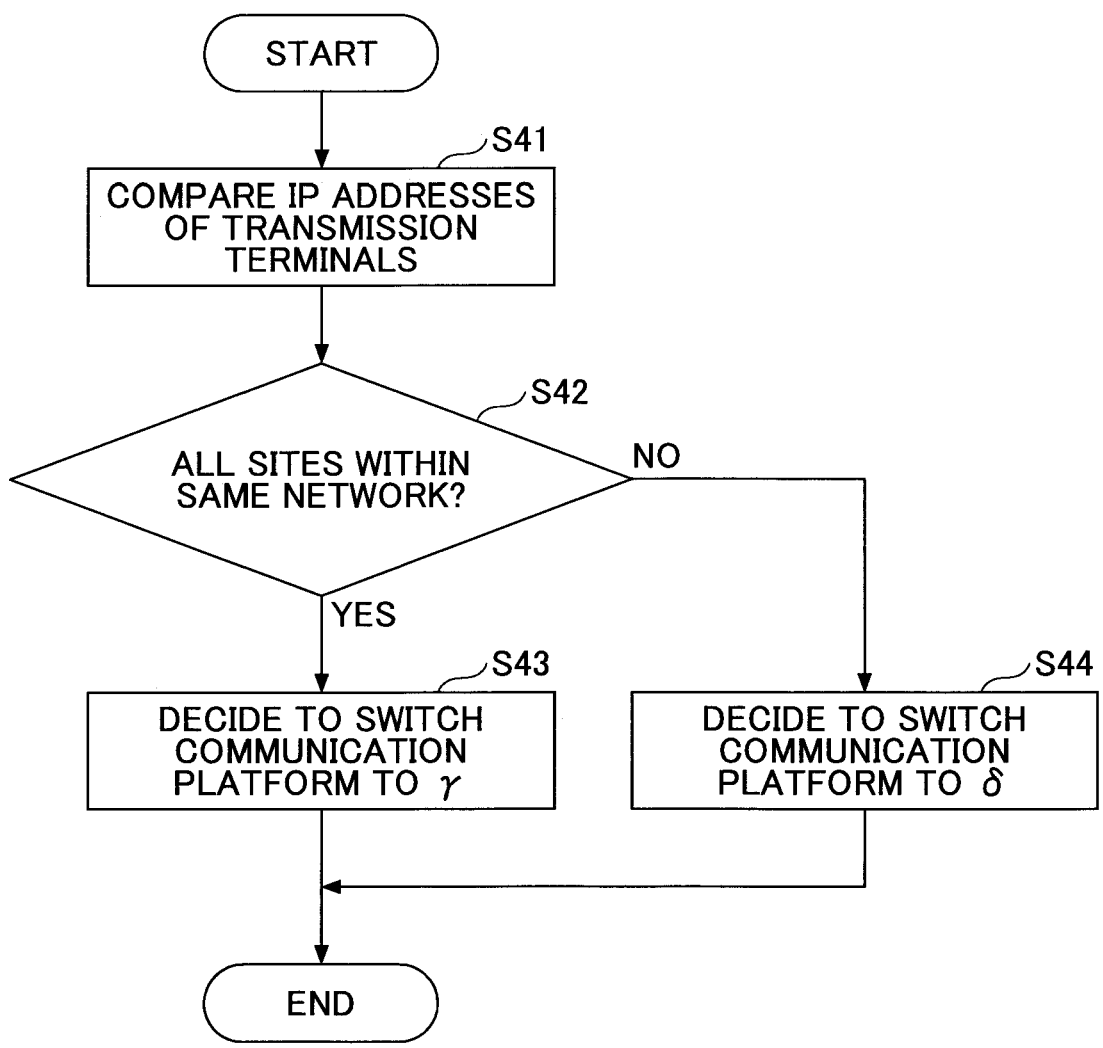

[Fig. 11]
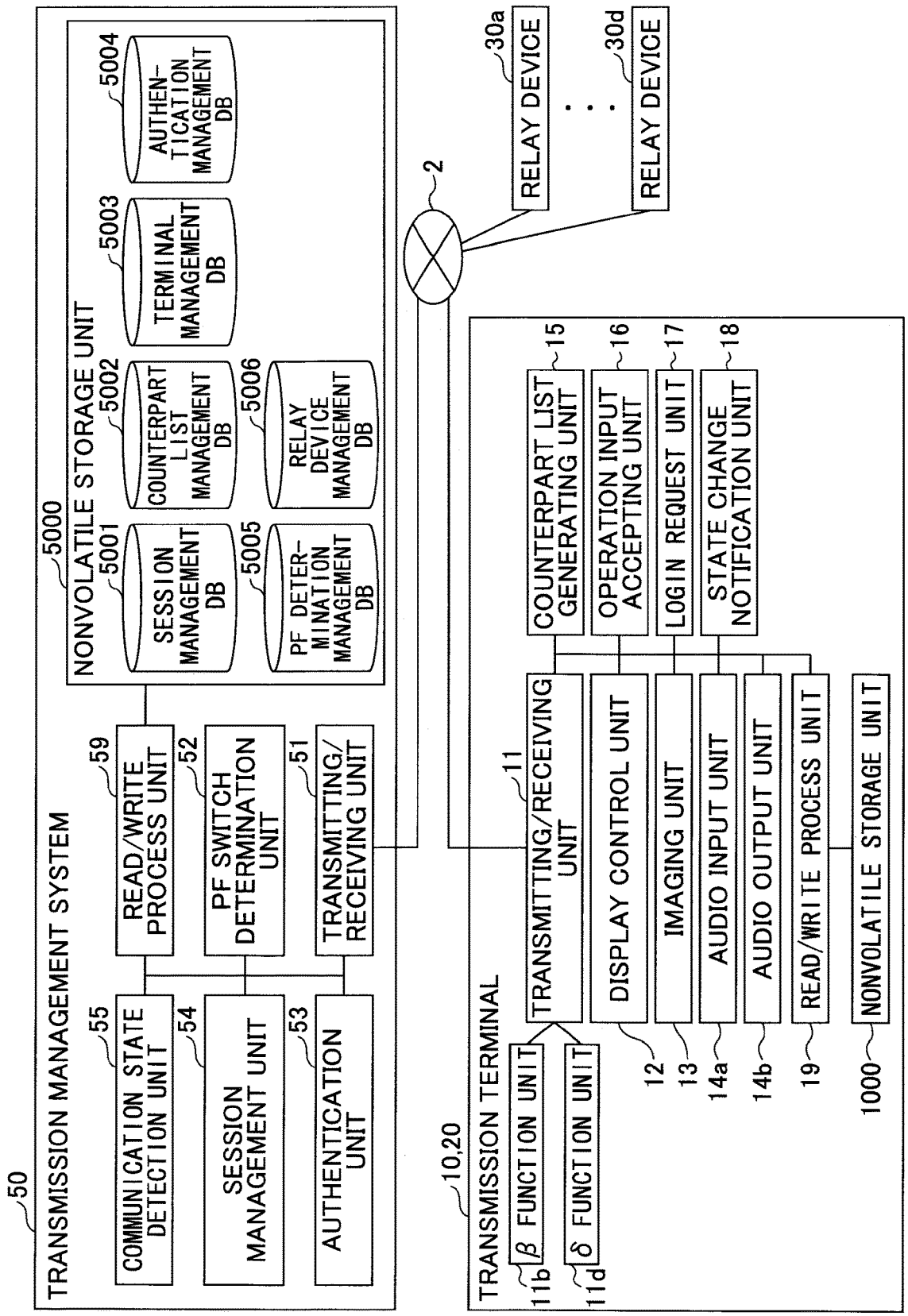

[Fig. 12]
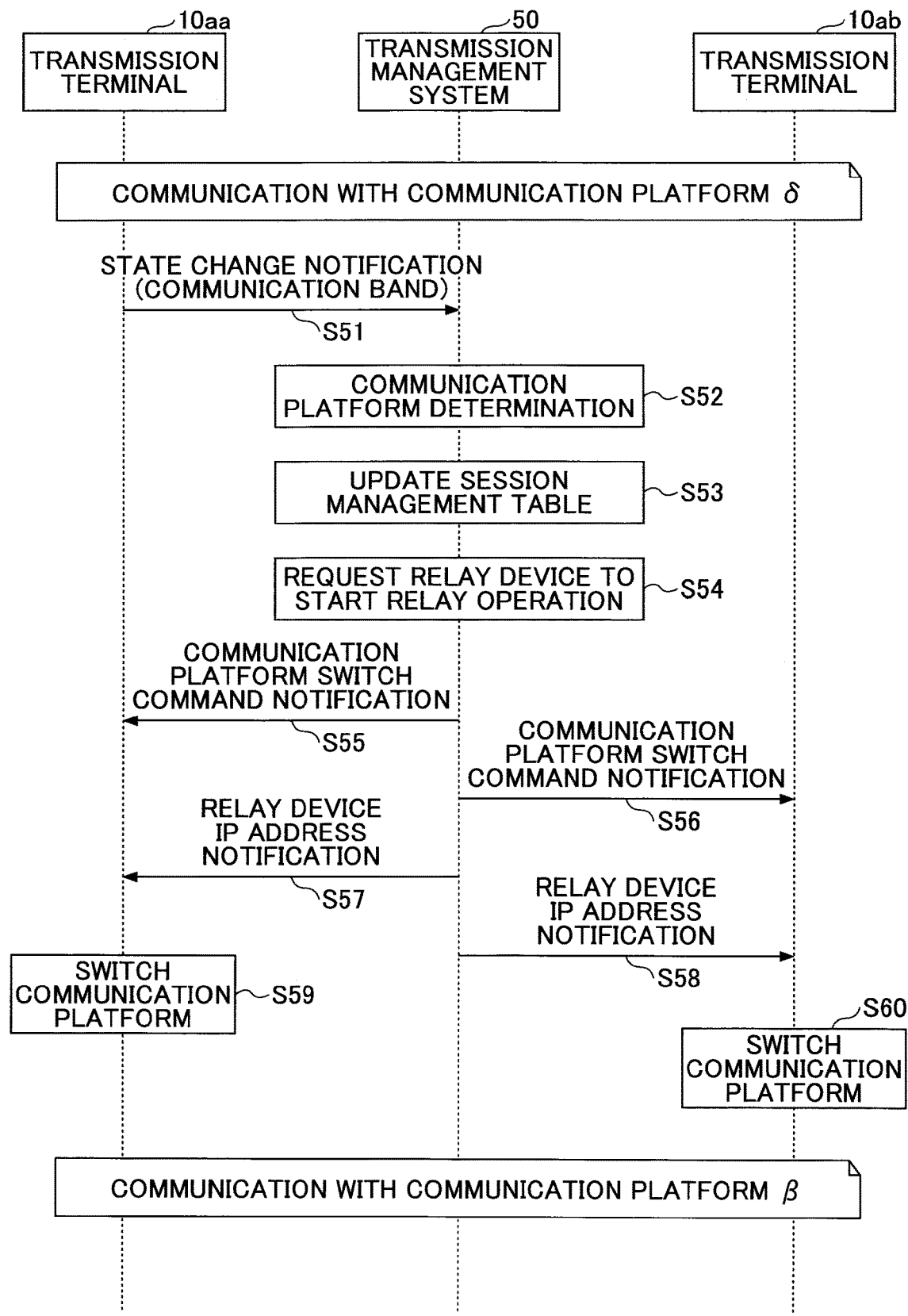

[Fig. 13]
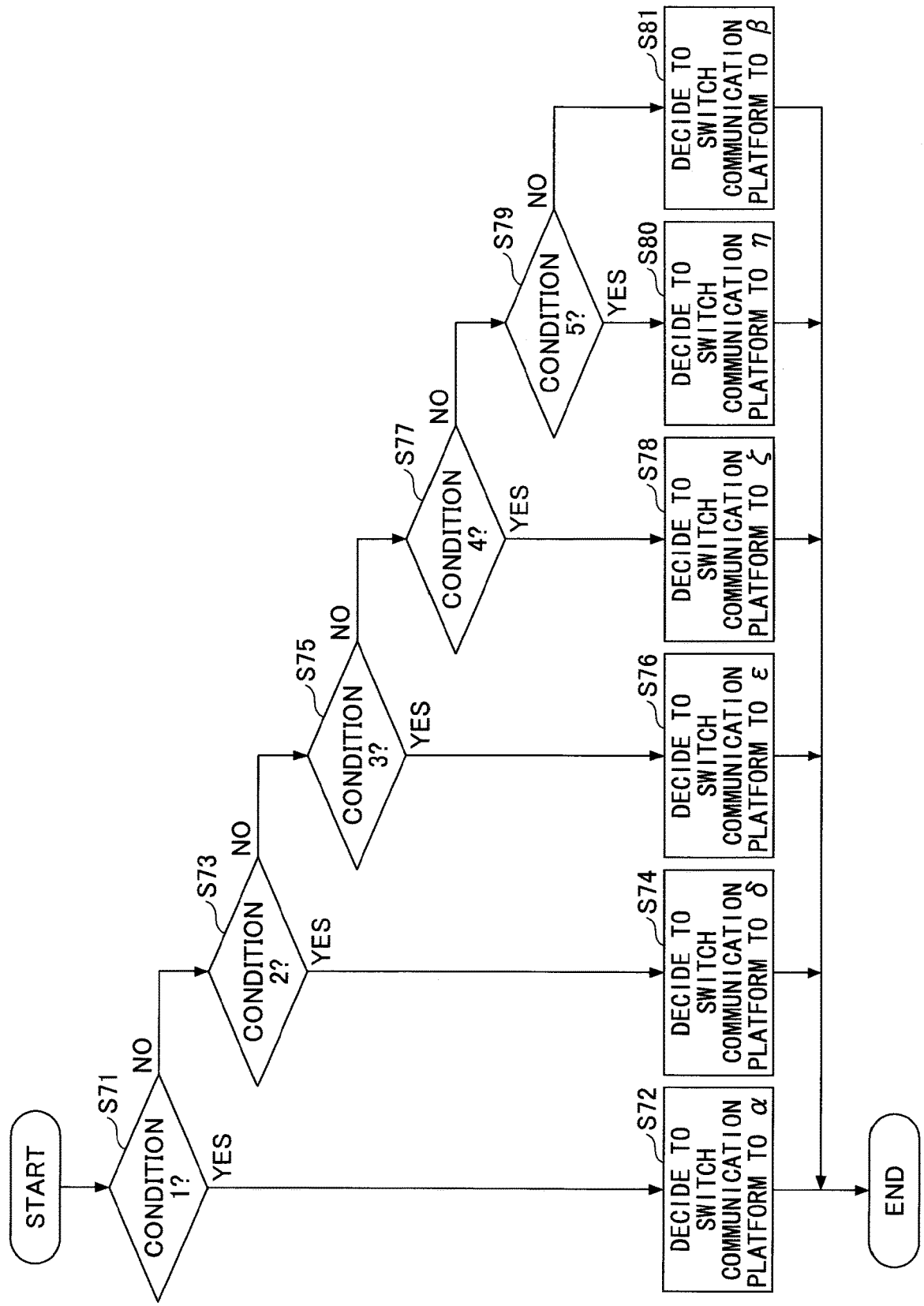

[Fig. 14]
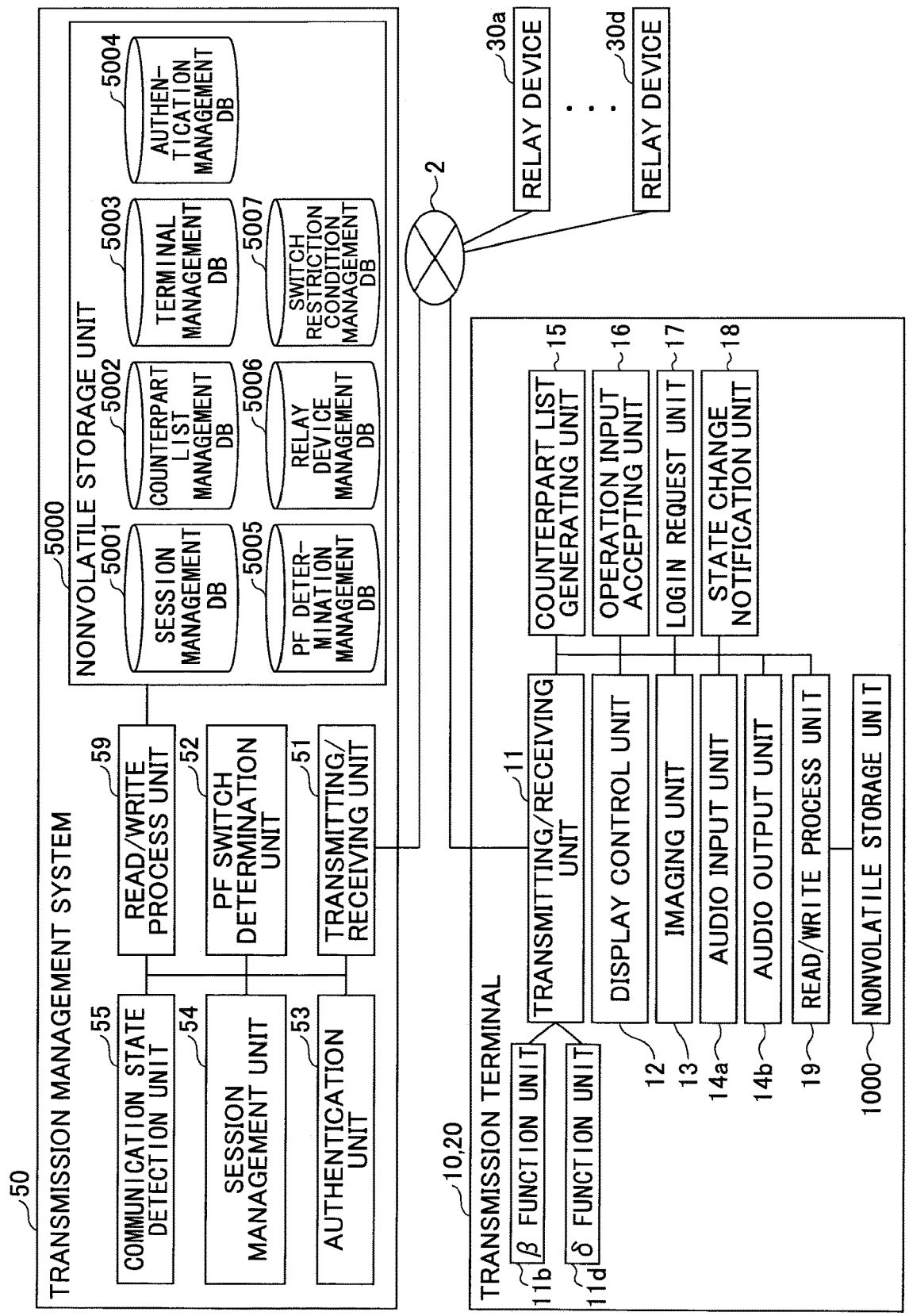

[Fig. 15]
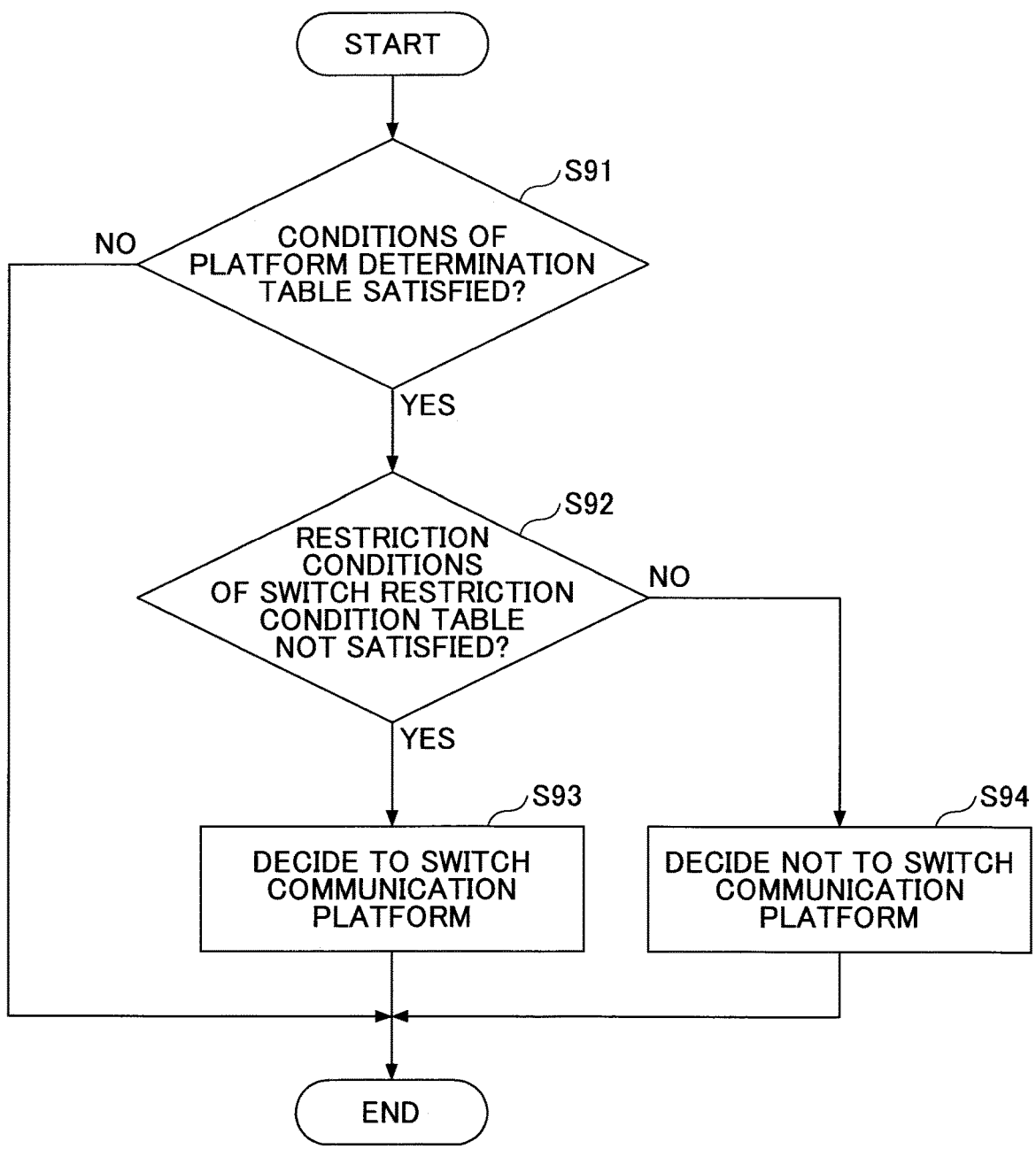

[Fig. 16]
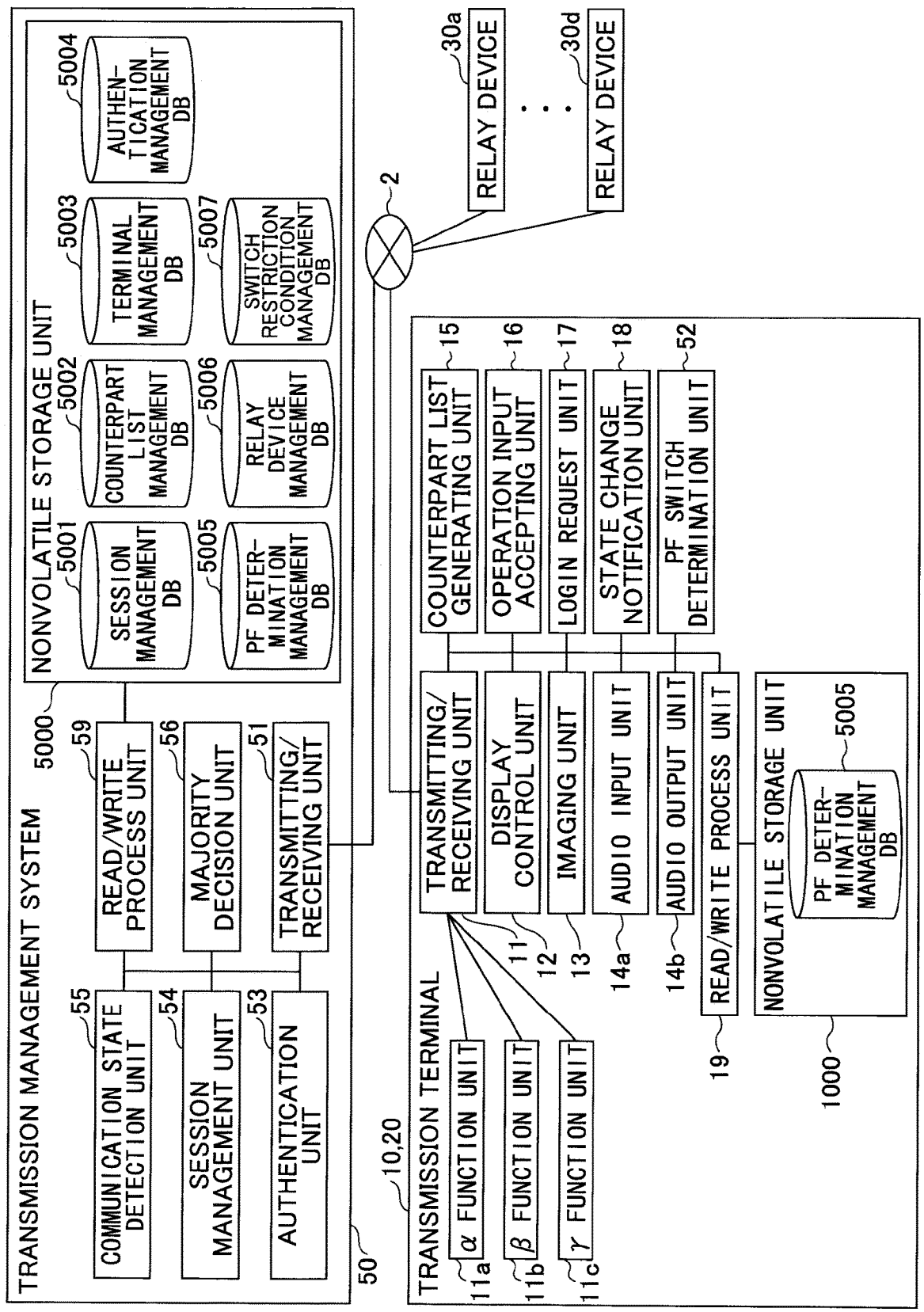

[Fig. 17]
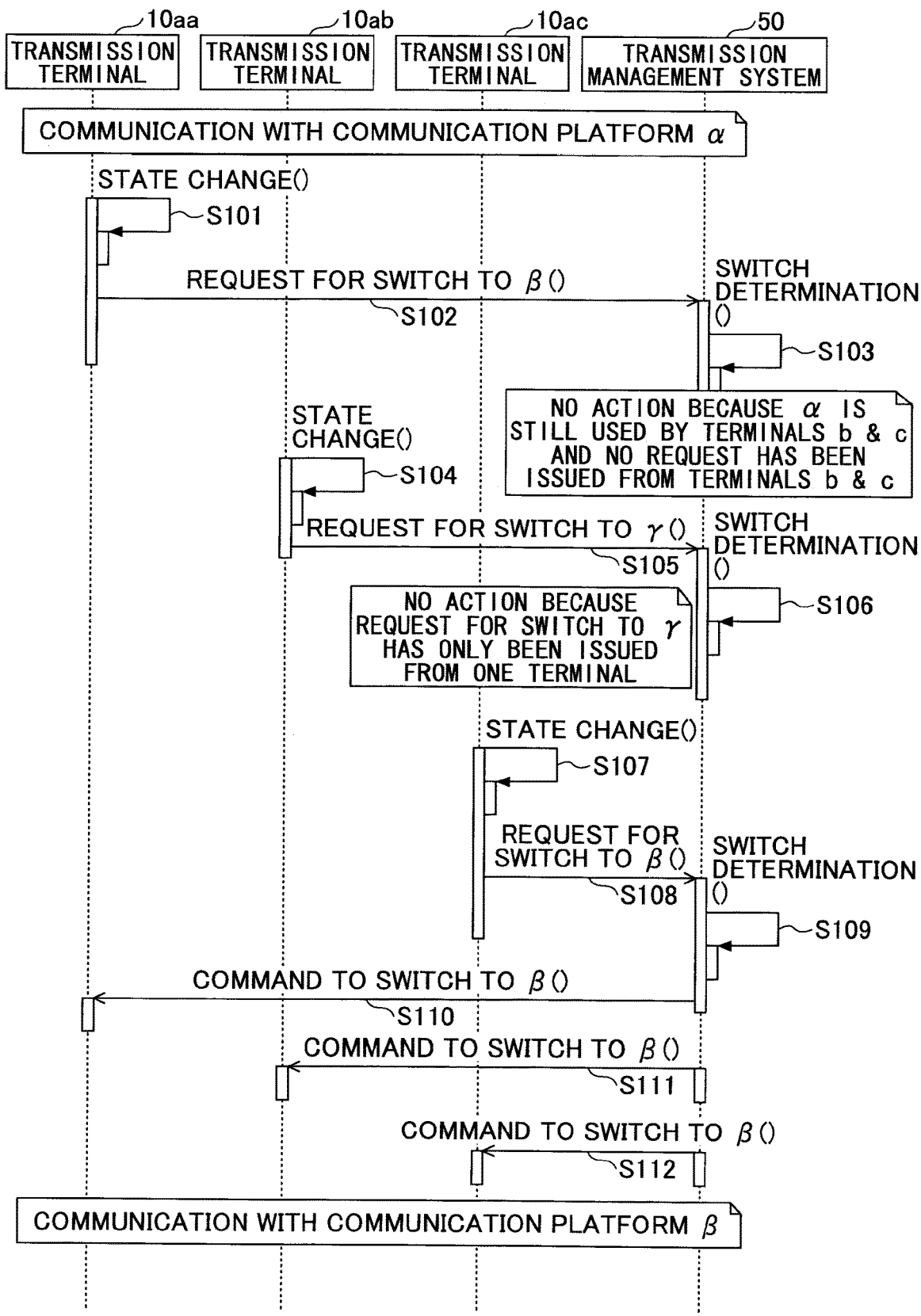

US 10,630,736 B2

INFORMATION PROCESSING APPARATUS, COMMUNICATION PLATFORM DETERMINING METHOD, TRANSMISSION SYSTEM, AND TRANSMISSION TERMINAL

TECHNICAL FIELD

The present invention relates to an information processing apparatus, a communication platform determining method, a transmission system, and a transmission terminal.

BACKGROUND ART

A teleconference system is an example of a transmission system for holding a teleconference between a plurality of transmission terminals via a communication network such as the Internet. In such a teleconference system, image data and audio data gathered during a teleconference are transmitted from one transmission terminal to another transmission terminal. The other transmission terminal receives the image data and the audio data, displays the received image data on a display, and outputs the received audio data from a speaker, for example. In this way, a teleconference may be held between the transmission terminals.

These days, there is increased diversification of communication platforms (infrastructure system or mechanism for establishing communication) for transmitting image data and audio data between a plurality of transmission terminals. Thus, even when a teleconference is held between transmission terminals that are within the same network, service providers and users may be using any one of a plurality of communication platforms.

These communication platforms may have different features in terms of communication stability, reduction of delay, available band, cost, and/or number of sites they can accommodate, for example, and a user may select a desired communication platform depending on the purpose of communication and the type of data to be exchanged, for example. However, it is not always easy for the user to select a suitable communication platform.

Techniques are known for selecting a suitable communication platform from among a plurality of communication platforms. For example, U.S. Pat. No. 8,838,699 discloses a technique for automatically selecting a platform to be used from among a plurality of platforms that are supported by the system in order to minimize security risks.

CITATION LIST

Patent Literature

PTL 1: U.S. Pat. No. 8,838,699

SUMMARY OF INVENTION

Technical Problem

However, according to the technique disclosed in U.S. Pat. No. 8,838,699, a suitable communication platform cannot be selected after a teleconference has been started. That is, in a conventional teleconference system, the communication platform that has been selected at the start of a teleconference has to be continuously used, and the selection of the communication platform cannot be changed after the teleconference has been started.

In view of the above, an aspect of the present invention is directed to providing an information processing apparatus that is capable of switching a communication platform to a suitable communication platform after communication has been started.

Solution to Problem

According to one embodiment of the present invention, an information processing apparatus is provided that interconnects a plurality of transmission terminals supporting a plurality of communication platforms. The information processing apparatus includes a state detection unit configured to detect a communication state relating to at least one of a communication between the transmission terminals and a communication between at least one of the transmission terminals and the information processing apparatus; a read unit configured to read from a storage unit communication platform determination information associating the plurality of communication platforms with the communication state; and a determination unit configured to determine that a communication platform of the plurality of communication platforms that is registered in the communication platform determination information in association with the communication state that has been detected by the state detection unit is to be used in the communication between the transmission terminals.

Advantageous Effects of Invention

An information processing apparatus may be provided that is capable of switching a communication platform to a suitable communication platform after communication has been started.

BRIEF DESCRIPTION OF DRAWINGS

FIG. 1A is a diagram illustrating an example of switching a communication platform;

FIG. 1B is another diagram illustrating the example of switching a communication platform;

FIG. 2 is a schematic diagram illustrating an exemplary transmission system;

FIG. 3 is block diagram illustrating an exemplary hardware configuration of a transmission terminal;

FIG. 4 is a block diagram illustrating an exemplary hardware configuration of a transmission management system;

FIG. 5 is a block diagram illustrating exemplary functional configurations of the transmission terminal and the transmission management system according to a first embodiment;

FIG. 6 is a sequence chart illustrating a process implemented by the transmission terminal for establishing a session;

FIG. 7 is a sequence chart illustrating a process for switching a communication platform according to the first embodiment;

FIG. 8 is a flowchart illustrating an exemplary communication platform determination process;

FIG. 9 is a block diagram illustrating exemplary functional configurations of the transmission terminal and the transmission management system according to a second embodiment;

FIG. 10 is a flowchart illustrating an exemplary process implemented by a platform switch determination unit for switching a communication platform based on a platform determination table according to the second embodiment;

FIG. 11 is a block diagram illustrating exemplary functional configurations of the transmission terminal and the transmission management system according to a third embodiment;

FIG. 12 is a sequence chart illustrating a procedure for switching a communication platform according to the third embodiment;

FIG. 13 is a flowchart illustrating an exemplary procedure implemented by the platform switch determination unit for switching a communication platform based on the platform determination table according to a fourth embodiment;

FIG. 14 is a functional block diagram illustrating exemplary functional configurations of the transmission terminal and the transmission management system according to a fifth embodiment;

FIG. 15 is a flowchart illustrating a procedure implemented by the platform switch determination unit for switching a communication platform based on the platform determination table according to the fifth embodiment;

FIG. 16 is a block diagram illustrating exemplary functional configurations of the transmission terminal and the transmission management system according to a sixth embodiment; and FIG. 17 is a sequence chart illustrating an exemplary procedure for determining whether the transmission management system should switch the communication platform.

DESCRIPTION OF EMBODIMENTS

In the following, embodiments of the present invention are described with reference to the accompanying drawings.

Example 1

FIGS. 1A and 1B illustrate an example of switching a communication platform according to a first embodiment. In FIG. 1A, transmission terminals 10aa and 10ab and a transmission management system 50 are connected to a communication network 2. The transmission management system 50 notifies (signals) each of the transmission terminals 10aa and 10ab of the existence of the other and starts communication between the transmission terminals 10aa and 10ab. For example, the transmission terminals 10aa and 10ab may communicate through one-on-one (peer to peer) communication using an API (Application Interface) called WebRTC (Web Real-Time Communication). Note that the transmission management system 50 is not involved in the transmission/reception of content data CD (image data and audio data) between the transmission terminals 10aa and 10ab.

Then, as illustrated in FIG. 1B, in the present example, a transmission terminal 10ac is added as another communication counterpart to the communication between the transmission terminals 10aa and 10ab. When the transmission terminal 10ac is added, the number of terminals participating in one teleconference becomes three, and as such, the transmission management system 50 determines that the communication platform (hereinafter referred to as "communication PF") should be switched to a communication PF for establishing communication using the communication standard H.323. That is, the transmission management system 50 switches the communication PF being used to a communication PF that uses a relay device 30, and establishes communication between the transmission terminals 10aa, 10ab, and 10ac by having the relay device 30 relay the content data CD to the transmission terminals 10aa, 10ab, and 10ac.

As described above, in the transmission system 1 according to the present embodiment, the communication PF being used can be switched to a suitable communications PF in response to a change in circumstances even after communication has already been started. Note that one-on-one communication is generally less expensive, but communication stability may be compromised when one-on-one communication is used to establish multipoint communication between multiple sites. In the present embodiment, the communication PF being used is switched to a communication PF that uses the relay device 30 when the number of terminals participating in the communication reaches a predetermined threshold value (e.g. three). In this way, the communication PF being used may be dynamically optimized taking into account both cost and stability.

<Communication PF>

In the following, the communication PF used in the present embodiment is described. The communication PF refers to an infrastructure system or mechanism for communication specifying at least one of a call control method, a communication path, and a compression method for compressing video and/or audio. For example, in FIG. 1A, a communication PF for controlling calls using the WebRTC is used to establish communication between the transmission terminals 10aa and 10ab. In FIG. 1B, a communication PF for interconnecting the transmission terminals 10aa, 10ab, and 10ac via the relay device 30 using the communication standard H.323 (including call control) is used to establish communication between the transmission terminals 10aa, 10ab, and 10ac. Thus, in the above example, the call control method and the communication path are switched.

The following are non-limiting examples of elements that may constitute a communication PF. Note, however, that the communication PF is not limited to these examples.

Call Control: (1) H.323 (above), (2) WebRTC (above), (3) SIP (Session Initiation Protocol), (4) an extension protocol to the SIP, (5) instant messenger protocol, (6) protocol using the SIP MESSAGE method, (7) Internet Relay Chat (IRC) protocol, (8) extension protocol to instant messenger protocol, etc.

Communication Path: presence/absence of the relay device 30, switching of the relay device 30, switching of a function (interface) within the same relay device 30, etc.

Video Compression Method: H.264, H.264/AVC, H.264/SVC, H.265/HEVC, MPEG4, etc.

Audio Compression Method: G.711/G.722, Speex, Opus, iSAC/iLBC, etc.

Note that the video compression method and the audio compression method may be switched independently, or the image compression method and the audio compression method may be switched together as one set. For example, in a case where switching the call control method or the communication path involves switching the video compression method and the audio compression method, the video compression method and the audio compression method may be switched together as one set. In a case where switching the call control method or the communication path does not involve switching the video compression method and the audio compression method, the video compression method and the audio compression method do not have to be switched, but one or both of the video compression method and the audio compression method may be switched as desired. Also, regardless of whether the call control method or the communication path is switched, the video compression method or the audio compression may be switched independently.

Note that a call control protocol such as the SIP may be classified into the communication protocol of the application layer. Also, a suitable communication protocol such as RTP (Real-time Transport Protocol), HTTP, HTTPs, TCP/IP, or UDP/IP may be used according to each call control method.

That is, in some embodiments, the communication protocol may be switched along with the call control method. In other embodiments, the same communication protocol may continue to be used even when the call control method is switched.

<Transmission System Configuration>

FIG. 2 is a schematic diagram illustrating an exemplary configuration of a transmission system 1 according to the present embodiment. The transmission system 1 is a communication system for communicating information, emotions, and the like between a plurality of transmission terminals via the transmission management system 50. Specific examples of the transmission system 1 include a videoconferencing system, a videophone system, an audio conferencing system, an audio phone system, a PC (Personal Computer) screen sharing system, a text chat system, and the like. Also, the transmission system 1 includes a data providing system for transmitting content data in one direction from one transmission terminal to another transmission terminal via the transmission management system 50.

In the present embodiment, it is assumed that the transmission system 1 is a communication system that is capable of holding a videoconference.

Note, however, that the transmission system of the present invention should not be construed as being limited to the present embodiment.

In FIG. 2, the transmission system 1 includes a plurality transmission terminals (10aa, 10ab, . . . ), a plurality of mobile terminals (20aa, 20ab, . . . ), displays (120aa, 120ab, . . . ) for the individual transmission terminals (10aa, 10ab, . . . ), a plurality of relay devices (30a, 30b, . . . ), a transmission management system 50, a plurality of routers (70a, 70b . . . ), and a program providing system 90.

The plurality of transmission terminals 10 transmits and receives content data including image data and audio data. That is, the plurality of transmission terminals 10 correspond to videoconference terminals that are capable of using a videoconferencing service. In the present embodiment, it is assumed that the transmission terminals 10 are dedicated terminals for videoconferencing.

On the other hand, the plurality of mobile terminals 20 transmit and receive content data including image data and audio data. The mobile terminals 20 may also be capable of exchanging text data. That is, the plurality of the mobile terminals 20 may be capable of using a text chat service as well as a videoconferencing service, for example. In the present embodiment, unless otherwise indicated, the mobile terminal 20 may be an industrial device having a communication function such as a tablet terminal, a mobile phone, a smartphone, a PDA (Personal Digital Assistant), a wearable PC, a game machine, a general-purpose PC terminal, a car navigation terminal, an electronic whiteboard, a projector, or a surveillance camera, for example. The industrial device may also include office equipment such as a MFP (Multifunction Peripheral/Printer/Product), medical devices such as an endoscope, and agricultural equipment such as a tiller. The wearable PC may include a watch, a head-mounted display, and the like. Note that the mobile terminal 20 may be wirelessly connected to the communication network 2 via a mobile communication network or WiFi (Wireless Fidelity), for example.

Note that the transmission terminal 10 and the mobile terminal 20 are examples of transmission terminals according to the present invention.

The transmission terminal 10 and the mobile terminal 20 are managed by the transmission management system 50 that manages call control of the transmission system 1. The transmission management system 50 is an example of an information processing apparatus according to the present invention.

Note that in the following descriptions, an arbitrary one or ones of the plurality of transmission terminals (10aa, 10ab, . . . ) is/are referred to as a "transmission terminal(s) 10", and an arbitrary one or ones of the plurality of mobile terminals (20aa, 20ab, . . . ) is/are referred to as a "mobile terminal(s) 20". An arbitrary one or ones of the plurality of displays (120aa, 120ab, . . . ) is/are referred to as a "display(s) 120". An arbitrary one or ones of the plurality of relay devices (30a, 30b, . . . ) is/are referred to as a "relay device(s) 30", and an arbitrary one or ones of the plurality of routers (70a, 70b, . . . ) is/are referred to as a "router(s) 70".

Further, a transmission terminal 10 or a mobile terminal 20 that sends a request to start a videoconference is referred to as a "requesting terminal", and a transmission terminal 10 or a mobile terminal 20 that receives the request (request destination) is referred to as a "counterpart terminal".

Also, in the transmission system 1, a management information session is established between the requesting terminal and the counterpart terminal for exchanging various types of management information via the management system 50. Further, a session is established between the requesting terminal and the counterpart terminal for exchanging content data. The session for exchanging content data may involve transmitting/receiving content data to/from the requesting terminal and the counterpart terminal via the relay device 30. Note, however, that the session for exchanging content data does not necessarily have to be implemented via the relay device 30. In other examples, the content data may be exchanged via the transmission management system 50, or the content data may be exchanged directly between the requesting terminal and the counterpart terminal.

As described above, the relay device 30 relays content data to be exchanged between a plurality of transmission terminal(s) 10 and/or mobile terminal(s) 20.

The transmission management system 50 performs management operations such as login authentication of the transmission terminal 10 and the mobile terminal 20, communication state management, counterpart list management, and management of the relay device 30 through notification of a transmission destination of content data or directing the relay device 30 to manage communication state information, for example.

The transmission management system 50 may be an industrial device having a communication function such as a surveillance camera, a wearable PC, and the like. The industrial device may include office equipment such as an MFP, a medical device such as an endoscope, and agricultural equipment such as a tiller, for example. The wearable PC may include a watch and a head-mounted display, for example.

The program providing system 90 stores a terminal program in a HD (hard disk) 204 (described below) for enabling the transmission terminal 10 or the mobile terminal 20 to implement various functions, and the program providing system 90 is capable of transmitting the terminal program to the transmission terminal 10 and the mobile terminal 20.

Also, the program providing system 90 stores a transmission management program in a HD 304 (described below) for enabling the transmission management system 50 to implement various functions, and the program providing system 90 is capable of transmitting the transmission management program to the transmission management system 50.

Note that in FIG. 2, the transmission terminals (10aa, 10ab, 10ac, . . . ), the relay device 30a, and the router 70a are communicatively interconnected by a LAN 2a. The transmission terminal (10ba, 10bb, 10bc, . . . ), the mobile terminal (20aa, 20ab, . . . ), the relay device 30b, and the router 70b are communicatively interconnected by a LAN 2b. Also, the LAN 2a and the LAN 2b are communicatively interconnected by a dedicated line 2ab that includes the router 70ab, and the LAN 2a and the LAN 2b are configured in a certain area A. For example, the area A may be Japan, the LAN 2a may be configured in an office located in Tokyo, and the LAN 2b may be configured in an office located in Osaka. The mobile terminals (20aa, 20ab, . . . ) are used in the area A.

Meanwhile, the transmission terminals (10ca, 10cb, 10cc, . . . ), the relay device 30c, and the router 70c are communicably interconnected by a LAN 2c. The transmission terminals (10da, 10db, 10dc, . . . ), the mobile terminals (20ac, 20ad, . . . ), the relay device 30d, and the router 70d are communicatively interconnected by a LAN 2d. Also, the LAN 2c and the LAN 2d are communicably interconnected by a dedicated line 2cd that includes the router 70cd, and the LAN 2c and the LAN 2d are configured in a certain area B. For example, the area B may be the United States, the LAN 2c may be configured in an office located in New York, and the LAN 2d may be configured in an office located in Washington D.C. Also, the mobile terminals (20ac, 20ad, . . . ) are used in the area B.

The transmission management system 50 and the program providing system 90 are communicably connected to the transmission terminals 10, the mobile terminals 20, and the relay devices 30 via the Internet 2i. Note that the transmission management system 50 or the program providing system 90 may be provided in the area A or the area B, or may be provided in areas other than the above areas.

Also, note that the four digits indicated at the bottom of each transmission terminal 10, each mobile terminal 20, each relay device 30, the transmission management system 50, each router 70, and the program providing system 90 in FIG. 2 represent general IPv4 addresses in abbreviated forms.

<Hardware Configuration>
<<Transmission Terminal>>

In the following, a hardware configuration of the transmission terminal 10 is described with reference to FIG. 3. FIG. 3 illustrates an exemplary hardware configuration of the transmission terminal 10 according to the present embodiment. In FIG. 3, the transmission terminal 10 includes a CPU (Central Processing Unit) 101 for controlling the overall operation of the transmission terminal 10. The transmission terminal 10 further includes a ROM (Read Only Memory) 102 that stores a program such as an IPL (Initial Program Loader) that is used for driving the CPU 101 and a RAM (Random Access Memory) 103 that can be used as a working area of the CPU 101. The transmission terminal 10 also includes a flash memory 104 for storing a terminal program 130 and various data such as image data and audio data. The transmission terminal 10 further includes a SSD (Solid State Drive) 105 for controlling reading/writing of various data to the flash memory 104 under control of the CPU 101. The transmission terminal 10 further includes a medium drive 107 for controlling reading/writing (storing) of data on a recording medium 106 such as a flash memory, and an operation button 108 that is operated when selecting a destination of the transmission terminal 10, for example. Also, the transmission terminal 10 includes a power switch 109 for switching on/off the power of the transmission terminal 10, and a network I/F (Interface) 111 for transmitting data using the communication network 2.

In addition, the transmission terminal 10 includes a built-in camera 112 for capturing an image of an object and acquiring image data of the captured image according to control by the CPU 101, an imaging element I/F 113 that controls drive operations of the camera 112, and a built-in microphone 114 for inputting audio. Also, the transmission terminal 10 includes a built-in speaker 115 for outputting audio, an audio input/output I/F 116 for processing the input/output of audio signals to/from the microphone 114 and the speaker 115 under control of the CPU 101. The transmission terminal 10 further includes a display I/F 117 for transmitting image data to an external display 120 under control of the CPU 101, and an external device connection I/F 118 for connecting various external devices. Also, the transmission terminal 10 includes an authentication accepting I/F 119, and a bus line 110 such as an address bus or a data bus for electrically connecting the above elements illustrated in FIG. 3.

The display 120 is a display unit including a liquid crystal display or an organic EL display that displays an image of an object and operation icons, for example. The display 120 is connected to the display I/F 117 by a cable 120c. Note that although the display 120 of the transmission terminal 10 is connected to the display I/F 117 by the cable 120c in the example of FIG. 3, the configuration of the display is not limited thereto. For example, the display 120 may be built inside the transmission terminal 10.

External devices such as an external camera, an external microphone, and an external speaker may be connected to the external device connection I/F 118 by a USB (Universal Serial Bus) cable or the like.

The authentication accepting I/F 119 is an interface for accepting an input of authentication information from a user. Specific examples of the authentication accepting I/F 119 include an IC card reader, an SD card reader, and a SIM card reader (e.g., using NFC (Near Field Communication) technology).

The terminal program 130 may be stored in a computer-readable recording medium such as the recording medium 106 as a file in an installable/executable format and be distributed in such a state, for example. Also, in some embodiments, the terminal program 130 may be configured to be stored in the ROM 102 instead of the flash memory 104, for example.

Note that the mobile terminal 20 may have a hardware configuration substantially similar to the hardware configuration of the transmission terminal 10, and even when there is a difference between the two, it is assumed that the mobile terminal 20 and the transmission terminal 10 may be interchangeably used without affecting the implementation of the transmission system 1.

<<Transmission Management System, Relay Device, Program Providing System>>

In the following, a hardware configuration of the transmission management system 50, the relay device 30, and the program providing system 90 is described with reference to FIG. 4. FIG. 4 illustrates and exemplary hardware configuration of the transmission management system 50, the relay device 30, and the program providing system 90 according to the present embodiment.

Note that the hardware elements illustrated in FIG. 4 do not necessarily have to be accommodated within one housing. That is, FIG. 4 merely illustrates exemplary hardware elements that are preferably included in the transmission management system 50, the relay device 30, the program providing system 90, and the like. Also, note that some of the hardware elements illustrated in FIG. 4 may be implemented by cloud computing. That is, the physical hardware configuration of the transmission management system 50 and the like according to the present embodiment does not have to be fixed, and hardware resources may be dynamically connected/disconnected according to the load and the like. In the following, the hardware configuration of the transmission management system 50 is described as an example.

The transmission management system 50 includes a CPU 301 that controls overall operations of the transmission management system 50, a ROM 302 that stores a program such as an IPL used for driving the CPU 301, a RAM 303 that is used as a working area of the CPU 301. In addition, the transmission management system 50 includes an HD 304 for storing various data such as a transmission management program 320, and an HDD (Hard Disk Drive) 305 that controls reading/writing of various types of data on the HD 304 under the control of the CPU 301. Further, the transmission management system 50 includes a medium drive 307 that controls reading/writing (storage) of data on a recording medium 306 such as a flash memory, and a display 308 for displaying various types of information such as a cursor, a menu, a window, a character, or an image, for example. Also, the transmission management system 50 includes a network I/F 309 for transmitting data using the communication network 2, a keyboard 311 including a plurality of keys for inputting characters, numbers, and various instructions, for example, and a mouse 312 for selecting/executing various instructions, selecting an item to be processed, or moving a cursor, for example. Also, the transmission management system 50 includes a CD-ROM drive 314 that controls reading/writing of various data on a CD-ROM (Compact Disc Read Only Memory) 313 as an example of a removable recording medium. Further, the transmission management system 50 includes a bus line 310 such as an address bus and/or a data bus for electrically connecting the above-described components illustrated in FIG. 4.

Note that the transmission management program 320 may be stored in a computer-readable recording medium such as the recording medium 306 or the CD-ROM 313 as a file in an installable/executable format and distributed in such a state. Also, in some embodiments, the transmission management program 320 may be stored in the ROM 302 instead of the HD 304.

Also, note that the relay device 30 and the program providing system 90 may have hardware configurations that are substantially similar to that of the above-described transmission management system 50, and as such, descriptions thereof are omitted.

<Functional Configuration>

In the following, functional configurations of the transmission terminal 10 and the transmission management system 50 are described with reference to FIG. 5. FIG. 5 is a block diagram illustrating exemplary functional configurations of the transmission terminal 10 and the transmission management system 50. Note that because the program providing system 90 is not directly relevant to the implementation of the functional features of the present embodiment an illustration thereon is omitted in FIG. 5. Also, note that a functional configuration of the mobile terminal 20 may be substantially similar to the functional configuration of the transmission terminal 10, and even if there is a difference between the two, it is assumed that the transmission terminal 10 and the mobile terminal 20 may be interchangeably used without affecting the implementation of the present embodiment.

<<Functional Configuration of Transmission Terminal>>

The transmission terminal 10 includes a transmitting/receiving unit 11, a display control unit 12, an imaging unit 13, an audio input unit 14*a*, an audio output unit 14*b*, a counterpart list generating unit 15, an operation input accepting unit 16, a login request unit 17, and a read/write process unit 19.

Note that the functional elements of the transmission terminal 10 illustrated in FIG. 5 may be implemented by one or more of the hardware elements illustrated in FIG. 3 performing an operation triggered by an instruction from the CPU 101 according to the terminal program 130 that is loaded from the flash memory 104 into the RAM 103.

The transmission terminal 10 also includes a nonvolatile storage unit 1000 that may be implemented by the flash memory 104 illustrated in FIG. 3.

The transmitting/receiving unit 11 of the transmission terminal 10 is implemented by the network I/F 111 and an instruction from the CPU 101 of FIG. 3. The transmitting/receiving unit 11 transmits/receives various types of data to/from another transmission terminal 10, transmission management system 50, the relay device 30, and the like via the communication network 2.

An α function unit 11*a* and a β function unit 11*b* are connected to the transmitting/receiving unit 11. The α function unit 11*a* performs processes necessary for implementing a communication PF α, and the β function unit 11*b* performs processes necessary for implementing a communication PF β. For example, the α function unit 11*a* may perform a process for notifying a counterpart terminal of a global IP address and a port number to be used in WebRTC, and the β function unit 11*b* may perform a process for notifying a counterpart terminal of an IP address of the relay device 30 to be used (which may be either a private IP address or a global IP address of the relay device 30). Note that when communication protocols used by the communication PF α and the communication PF β are different, the α function unit 11*a* establishes communication according to the communication protocol used by the communication PFα, and the β function unit 11*b* establishes communication according to the communication protocol used by the communication PF β. Further, when video/audio compression methods used by the communication PF α and the communication PF β are different, the α function unit 11*a* compresses/decompresses video/audio data that has been compressed according to the compression method used by the communication PF α, and the β function unit 11*b* compresses/decompresses video/audio data that has been compressed according to the compression method used by the communication PF β.

The display control unit 12 is implemented by the display I/F 117 and an instruction from the CPU 101 of FIG. 3. The display control unit 12 performs control for transmitting (outputting) image data to the external display 120.

The imaging unit 13 is implemented by the camera 112, the imaging element I/F 113, and instructions from the CPU 101 of FIG. 3. The imaging unit 13 captures an image of an object and outputs image data of the captured image.

The audio input unit 14*a* is implemented by the audio input/output I/F 116 and an instruction from the CPU 101 of FIG. 3. After the voice of a user is converted into an audio signal by the microphone 114, the audio input unit 14*a* inputs audio data relating to the audio signal.

The audio output unit 14*b* is implemented by the audio input/output I/F 116 and an instruction from the CPU 101 of FIG. 3. The audio output unit 14*b* outputs an audio signal relating to audio data to the speaker 115 such that audio is output from the speaker 115.

The counterpart list generating unit 15 is implemented by an instruction from the CPU 101 of FIG. 3. The counterpart list generating unit 15 generates and updates a counterpart list based on counterpart state information (counterpart candidate terminals and operation states of transmission terminal(s) 10 and mobile terminal(s) 20 corresponding to the counterpart candidate terminals) received from the transmission management system 50.

The operation input accepting unit 16 is implemented by the operation button 108, the power switch 109, and an instruction from the CPU 101 of FIG. 3. The operation input accepting unit 16 receives various inputs from the user. For example, when the user turns on the power switch 109 illustrated in FIG. 3, the operation input accepting unit 16 uniquely identify a terminal or a user using the terminal. In some embodiments, the communication ID and a relay device ID may be identification information including a combination of at least two of language, characters, symbols, and other indicia for uniquely identifying a terminal/relay device, for example.

<<Functional Configuration of Transmission Management System>>

The transmission management system 50 includes a transmitting/receiving unit 51, a PF switch determination unit 52, an authentication unit 53, a session management unit 54, a communication state detection unit 55, and a read/write process unit 59. These functional elements may be implemented by one or more of the hardware elements shown in FIG. 4 performing an operation triggered by an instruction from the CPU 301 according to the transmission management program 320 that is loaded from the HD 304 into the RAM 303, for example. The transmission management system 50 also includes a nonvolatile storage unit 5000 that stores various data (or information) and is capable of maintaining the stored data even when the power of the transmission management system 50 is turned off. The nonvolatile storage unit 5000 may be implemented by the HD 304 of FIG. 4.

TABLE 1

(SESSION MANAGEMENT TABLE)

| SESSION ID | COMMUNI-CATION PF | RELAY DEVICE ID | REQUESTING TERMINAL ID | COUNTERPART TERMINAL ID | CONFERENCE ID |
|---|---|---|---|---|---|
| se1 | α | — | 01aa | 01ab | c001 |
| ... | ... | ... | ... | ... | ... | accepts the power-on operation input by the user and turns on the power of the transmission terminal 10.

The login request unit 17 is implemented by an instruction from the CPU 101 of FIG. 3. The operation of the login request unit 17 is triggered by the acceptance of the power-on operation by the user (or an authentication operation by the user). That is, in response to such user operation, the login request unit 17 automatically transmits login request information indicating a login request and the current IP address of the requesting terminal from the transmitting/receiving unit 11 to the transmission management system 50 via the communication network 2.

The read/write process unit 19 is implemented by the SSD 105 and an instruction from the CPU 101 of FIG. 3. The read/write process unit 19 writes (stores) various data in the nonvolatile storage unit 1000, and reads (retrieves) various data stored in the nonvolatile storage unit 1000, for example. The nonvolatile storage unit 1000 stores various data such as a communication ID (identification) for identifying a user or a transmission terminal 10 corresponding to a communication counterpart, type identification information (information distinguishing between the transmission terminal 10 and the mobile terminal 20), and a password, for example. Note that in some embodiments, the communication ID and the password may not be stored in the nonvolatile storage unit 1000, and a user may be required to input the communication ID and the password each time the user makes a login request to the transmission management system 50, for example.

Note that the communication ID in the present example corresponds to identification information including language, characters, symbols, and/or other indicia used to The nonvolatile storage unit 5000 includes a session management DB (database) 5001 that stores a session management table as illustrated in the above Table 1. The session management table stores and manages, with respect to each session ID used for executing a session for selecting a relay device 30, a corresponding communication PF, a relay device ID of the relay device 30 to be used in relaying data, a communication ID of the requesting terminal, a communication ID of the counterpart terminal, and a conference ID in association with one another. Note that in a case where a relay device 30 is not used, no information is registered for the relay ID associated with the corresponding session ID.

TABLE 2

(COUNTERPART LIST MANAGEMENT TABLE)

| COMMUNICATION ID | COUNTERPART CANDIDATE COMMUNICATION ID |
|---|---|
| 01aa | 01ab, 01ac, 02ab, 02ac, 02ad |
| 01ab | 01aa, 01ac, 02ab, 02ac, 02ad |
| 01ac | 01aa, 01ab, 02ab, 02ac, 02ad |
| 02ab | 01aa, 01ab, 01ac, 02ac, 02ad |
| 02ac | 01aa, 01ab, 01ac, 02ab, 02ad |
| 02ad | 01aa, 01ab, 01ac, 02ab, 02ac |

The nonvolatile storage unit 5000 also includes a counterpart list management DB 5002 that stores a counterpart list management table as illustrated in the above Table 2. The counterpart list management table stores and manages each communication ID of a requesting terminal that makes a request to start a connection (call) in a videoconference in association with communication IDs of transmission terminal(s) 10 and/or mobile terminal(s) 20 corresponding to counterpart candidate terminals. Note that the communication IDs of the counterpart candidate terminals identify the transmission terminal(s) 10 and/or the mobile terminal(s) 20 with which the requesting terminal is capable of starting communication.

TABLE 3

(TERMINAL MANAGEMENT TABLE)

| COMMUNICATION ID | OPERATION STATE | NAME | IP ADDRESS |
|---|---|---|---|
| 01aa | ONLINE | HEADQUARTERS | 1.2.1.3 |
| 01ab | ONLINE | TOKYO OFFICE | 1.2.1.4 |
| 01ac | OFFLINE | OSAKA OFFICE | 1.2.1.5 |
| 02ab | ONLINE | YAMADA TARO | 1.4.1.2 |
| 02ac | ONLINE | SATO JIRO | 1.5.1.1 |
| 02ad | OFFLINE | ITO SABURO | 1.5.1.2 |

The nonvolatile storage unit 5000 also includes a terminal management DB 5003 that stores a terminal management table as illustrated in the above Table 3. The terminal management table stores and manages, with respect to each communication ID of a terminal (transmission terminal 10 or mobile terminal 20), an operation state of the terminal, a name to be used when the communication ID of the terminal corresponds to the counterpart terminal ID, and an IP address of the terminal in association with one another.

TABLE 4

(AUTHENTICATION MANAGEMENT TABLE)

| COMMUNICATION ID | PASSWORD |
|---|---|
| 01aa | aaaa |
| 01ab | abab |
| 01ac | acac |
| 02ab | ABAB |
| 02ac | ACAC |
| 02ad | ADAD |

The nonvolatile storage unit 5000 also includes an authentication management DB 5004 that stores an authentication management table as illustrated in the above Table 4. The authentication management table stores and manages each communication ID of a user or a terminal in association with a corresponding password of the user or the terminal.

TABLE 5

(PF DETERMINATION TABLE)

| NUMBER OF SITES | COMMUNICATION PLATFORM |
|---|---|
| 2 | α (WebRTC) |
| 3 OR MORE | β (VIA RELAY DEVICE) |

The nonvolatile storage unit 5000 also includes a PF determination management DB 5005 that stores a PF determination management table as illustrated in the above Table 5. In the PF determination management table stores and manages a corresponding communication platform according to a number of sites. In the present example, the communication PF α refers to communication using the WebRTC, and the communication PF β refers to communication via the relay device 30 (communication implementing call control according to H.323). Note that the PF determination table is an example of communication platform determination information.

<<Functional Configuration of Transmission Management System>>

In the following, the functional configuration of the transmission management system 50 is described in detail. The transmitting/receiving unit 51 is implemented by the network I/F 309 and an instruction from the CPU 301 of FIG. 4. The transmitting/receiving unit 51 transmits/receives various data (or information) to/from the transmission terminal 10 and the relay device 30 via the communication network 2.

The authentication unit 53 is implemented by an instruction from the CPU 301 of FIG. 4. The authentication unit 53 authenticates a transmission terminal 10 or a user based on whether a combination of a communication ID and a password included in login request information that is received via the transmitting/receiving unit 51 is registered in the authentication management DB 5004. Note that the authentication method used by the authentication unit 53 is not limited thereto, and in other examples, a client certificate (authentication method using a public key and a private key) may be used.

The session management unit 54 is implemented by an instruction from the CPU 301 of FIG. 4. Upon receiving a request to establish connection with a counterpart terminal from a transmission terminal 10 that has been authenticated by the authentication unit 53 (i.e., upon acquiring start request information), the session management unit 54 stores information items including the communication PF, the relay device ID of the relay device 30 to relay content data (if the relay device 30 is used), the session ID, the communication ID of the requesting terminal, and the communication ID of the counterpart terminal, and the conference ID in association with one another in the session management DB 5001. Also, the session management unit 54 establishes an appropriate session for each communication PF, the details of which is described below.

The communication state detection unit 55 is implemented by an instruction from the CPU 301 of FIG. 4. The communication state detection unit 55 detects the states of communication between the transmission management system 50 and the transmission terminal 10 and communication between the transmission terminals 10. Note that the number of sites is an example of a communication state of the present embodiment.

The PF switch determination unit 52 is implemented by an instruction from the CPU 301 of FIG. 4. The PF switch determination unit 52 selects (determines) an appropriate communication PF by referring to the PF determination table (e.g., Table 5) according to the communication state (e.g., number of sites). Note that the determination and switching of the communication PF are described in detail below. If it is determined that the communication PF has to be switched, the PF switch determination unit 52 notifies the session management unit 54 of the communication PF to be used after the switch and requests the session management unit 54 to establish a session.

The read/write process unit 59 is implemented by the HDD 305 and an instruction from the CPU 301 of FIG. 4. The read/write process unit 59 stores various data in the nonvolatile storage unit 5000, and reads various data stored in the nonvolatile storage unit 5000.

<<Establishing Session according to Communication PF>>

In the following, a process of establishing a WebRTC session used by the communication PF α is briefly described. In WebRTC, for example, browsers (or applications with equivalent functions) communicate with each other without the intervention of a server. However, a process for identifying a communication counterpart (signaling) has to be implemented. In this respect, the transmission management system 50 that manages the operation states of the transmission terminals 10 in the terminal management table (e.g., Table 3) may be used to enable one user to identify another user as a communication counterpart (e.g., the user can identify the other user as the communication counterpart via a counterpart list screen described below). Once two transmission terminals 10 that are to communicate with each other can be identified, the session management unit 54 acts as a STUN (Session Traversal Utilities for Network Address Translator [NAT]) server and notifies each of the transmission terminals 10*aa* and 10*ab* of a global IP address and a port number outside a NAT (Network Address Translation) device of a corporate network or a home network in which the other transmission terminal 10 corresponding to the counterpart is arranged. In this way, the transmission terminals 10*aa* and 10*ab* may be informed of the global IP address and the port number of the other terminal, such that one-on-one communication beyond the NAT device may be established between the transmission terminals 10*aa* and 10*ab*, for example.

In the following, a process of establishing a session used in the communication PF β is briefly described. As in the session described above, the operation state of the transmission terminal 10 that has logged into the transmission management system 50 is stored and managed in the terminal management table. Thereafter, for example, when a user of the transmission terminal 10*aa* notifies the transmission management system 50 that the transmission terminal 10*ab* is to be the communication counterpart, the session management unit 54 selects an appropriate relay device 30. Although various methods are conceivable for selecting the relay device 30, in the present embodiment, the transmission delay time of data transmission from the relay device 30 to the transmission terminal 10 is considered. In the present embodiment, such a selection method it is referred to as "default selection method".

Once the session management unit 54 selects (determines) the relay device 30 to be used, the session management unit 54 notifies the selected relay device 30 of the communication IDs of the transmission terminals 10*aa* and 10*ab* that are to communicate with each other in one videoconference. The session management unit 54 or the relay device 30 associates a session ID with the communication IDs and assigns a conference ID to indicate participation in the same conference. In addition, the session management unit 54 notifies the transmission terminals 10*aa* and 10*ab* of the IP address of the relay device 30. When the transmission terminals 10*aa* and 10*ab* establish connection with the relay device 30 with their communication IDs, the relay device 30 relays content data to the transmission terminals 10*aa* and 10*ab* that are participating in the same videoconference based on the communication IDs.

<Communication Process of Transmission Terminal 10>

In the following, procedures for establishing a session that are implemented by the transmission terminals 10*aa* and 10*ab* are described with reference to FIG. 6. FIG. 6 is a sequence chart illustrating exemplary process steps implemented by the transmission terminals 10*aa* and 10*ab* for establishing a session. In the present embodiment, when two transmission terminals 10 start a videoconference, it is assumed that the communication PF α is used. However, in order to enable the transmission system 1 to accommodate for a case where three or more users are expected to participate in the videoconference, for example, the videoconference may be started using a communication PF that is designated by a user. For example, the user may designate the communication PF β in a request sent to the transmission management system 50 to start the videoconference with the communication PF β. In the following, the process steps of FIG. 6 are described.

Step S1: When the user turns on the power switch 109, the operation input accepting unit 16 accepts the power-on operation input by the user and turns on the power of the transmission terminal 10*aa*.

Step S2: In response to the above power-on operation, the login request unit 17 automatically transmits login request information indicating a login request from the transmitting/receiving unit 11 to the transmission management system 50 via the communication network 2. Note that the transmission of the login request is not limited to being triggered by the power-on operation as described above but can be triggered at an arbitrary time in response to a relevant user operation. The login request information includes a communication ID identifying the transmission terminal 10*aa* corresponding to the request sender, and a password. Note that in the case where the login request information is transmitted from the transmission terminal 10*aa* to the transmission management system 50, the transmission management system 50 receiving the login request is able to acquire the IP address (global IP address) of the transmission terminal 10*aa*.

Step S3: The authentication unit 53 of the transmission management system 50 performs terminal authentication by determining whether a combination of a communication ID and a password matching the communication ID and the password included in the login request received via the transmitting/receiving unit 51 is stored and managed in the authentication management table.

Step S4: If the transmission terminal 10*aa* is authenticated by the authentication unit 53, the session management unit 54 reads from the counterpart list management table, the communication IDs of terminals corresponding to counterpart candidate terminals with which the transmission terminal 10*aa* is capable of establishing a session. Also, the session management unit 54 reads from the terminal management table, the operation states of the counterpart candidate terminals. Note that in the present example, it is assumed that the operation state of the transmission terminal 10*ab* corresponding to the counterpart terminal is "online".

Step S5: Next, the transmitting/receiving unit 51 transmits counterpart state information including the communication IDs and the operation states of the terminals corresponding to counterpart candidates to the transmission terminal 10*aa* via the communication network 2. The counterpart state information also includes the names of the terminals registered in the terminal management table. In this way, the transmission terminal 10*aa* may become aware of the current operation state of the transmission terminal 10*ab* that is included in the list of counterpart candidates with which the transmission terminal 10*aa* is capable of establishing a session.

Step S6: Note that the transmitting/receiving unit 51 transmits the communication ID and the operation state of the transmission terminal 10*aa* that has made the login request to a terminal that has the transmission terminal 10*aa* registered as a counterpart candidate in its counterpart list. In the present example, the transmitting/receiving unit 51 transmits the communication ID and the operation state of the transmission terminal 10*aa* to the transmission terminal 10*ab*. In this way, transmission terminals 10 registered as counterpart candidates for each other in their respective counterpart lists may each be informed of the operation state of the other.

Step S7: Upon receiving the counterpart state information, the counterpart list generating unit 15 of the transmission terminal 10aa generates a counterpart list and displays the generated counterpart list at the display 120. In this way, the user of the transmission terminal 10aa may be able to select a communication ID of a terminal that is to be designated as the counterpart terminal in a communication start request from a counterpart list screen. In the present example, it is assumed that the transmission terminal 10ab has been selected as the counterpart terminal.

Step S8: When the user selects the counterpart terminal and makes a request to start communication with the selected counterpart terminal, the transmitting/receiving unit 11 of the transmission terminal 10aa transmits start request information to the transmission management system 50. The start request information includes the communication ID of the requesting terminal (requesting terminal ID) and the communication ID of the counterpart terminal (counterpart terminal ID). Also, note that by such a process, the transmitting/receiving unit 51 of the transmission management system 50 may become aware of the IP address of the requesting terminal 10aa.

Step S9: The session management unit 54 of the transmission management system 50 performs a process for establishing a session. That is, the session management unit 54 registers the session ID, the communication PF, the requesting terminal ID, the counterpart terminal ID, and the conference ID in the session management table. Also, the session management unit 54 sets the operation states of the transmission terminals 10aa and 10ab in the terminal management table to "communicating".

Steps S10 and S11: The session management unit 54 of the transmission management system 50 notifies each of the transmission terminals 10aa and 10ab of the global IP address and the port number of the other to enable communication beyond the NAT device as described above.

Step S12: In this way, communication between the transmission terminals 10aa and 10ab using the communication PF α can be started.

<<Communication PF Switching>>

In the following, a process of switching the communication PF is described with reference to FIG. 7. FIG. 7 is a sequence chart illustrating exemplary process steps for switching the communication PF.

Step S21: The transmission terminal 10ac logs into the transmission management system 50 in a manner similar to the login process implemented by the transmission terminals 10aa and 10ab, and generates/displays a counterpart list. In this way, the transmission terminal 10ac may be able to transmit start request information designating the transmission terminal 10aa as a counterpart terminal to the transmission management system 50. Note that in some embodiments, the transmission terminal 10aa may invite the transmission terminal 10ac to the videoconference by notifying the transmission terminal 10ac of the corresponding session ID.

Step S22: The transmitting/receiving unit 11 of the transmission terminal 10ac transmits the start request information to the transmission management system 50. The start request information includes the requesting terminal ID and the counterpart terminal ID. Note that by implementing this process, the transmitting/receiving unit 51 of the transmission management system 50 may become aware of the IP address of the requesting terminal 10ac.

Step S23: The PF switch determination unit 52 of the transmission management system 50 determines whether to switch the communication PF based on the communication state detected by the communication state detection unit 55. Note that the above determination process is described in detail below with reference to FIG. 8. In the present example, it is assumed that the PF switch determination unit 52 has decided to switch the communication PF.

Step S24: Next, the session management unit 54 updates the session management table. Table 6 shown below illustrates an example of the session management table that has been updated.

TABLE 6

(SESSION MANAGEMENT TABLE)

| SESSION ID | COMMUNI-CATION PF | RELAY DEVICE ID | REQUESTING TERMINAL ID | COUNTERPART TERMINAL ID | CONFERENCE ID |
|---|---|---|---|---|---|
| se1 | β | 111a | 01aa | 01ab | c001 |
| se2 | β | 111b | 01ac | 01aa | c001 |
| ... | ... | ... | ... | ... | ... |

According to Table 6, the communication PF is switched from α to β, and the relay device IDs of relay devices 30 that are required for the communication PF β are determined and registered. Also, the session ID of the session between the transmission terminals 10aa and 10ac, the communication PF, the relay device ID, the requesting terminal ID, the counterpart terminal ID, and the conference ID are registered. Note that in some embodiments, a new session ID may be created for the session between the transmission terminals 10aa and 10ab rather than continuing to use the previous session ID as illustrated in Table 6. Also, in some embodiments, session management tables in various formats suitable for the various communication PFs may be prepared, and after switching the communication PF, the session ID and other relevant information may be registered in the appropriate session management table according to the new communication PF after the communication PF switch.

Step S25: The session management unit 54 transmits a request to the relay device 30 to start relying content data along with the communication IDs of the transmission terminals 10aa, 10ab, and 10ac. In this way, the relay device 30 may determine that the transmission terminals 10aa, 10ab, and 10ac are participating in a single video conference, and be able to relay content data transmitted from the transmission terminal 10aa to the transmission terminals 10ab, and 10ac, for example.

Steps S26 and S27: The PF switch determination unit 52 of the transmission management system 50 transmits communication platform switch commands to the transmission terminals 10aa and 10ab. In this way, the transmission terminals 10aa and 10ab may be notified of the new communication PF after the communication PF switch.

Steps S28 and S29: The PF switch determination unit 52 of the transmission management system 50 notifies the transmission terminals 10aa and 10ab of the IP address of the relay device 30. In this way, the transmission terminals 10aa and 10ab may be able to transmit content data to the relay device 30.

Steps S30 and S31: The transmission terminal 10aa switches the communication PF, and the transmission terminal 10ab switches the communication PF. That is, the transmission terminals 10aa and 10ab switches from communication using the transmitting/receiving unit 11 and the α function unit 11a to communication using the transmitting/receiving unit 11 and the β function unit 11b.

Step S32: The PF switch determination unit 52 of the transmission management system 50 notifies the transmission terminal 10ac of the communication PF and the IP address of the relay device 30. In this way, the transmission terminal 10ac may be able to transmit content data to the relay device 30 using the transmitting/receiving unit 11 and the β function unit 11b.

Step S33: In this way, a videoconference may be held between the transmission terminals 10aa, 10ab, and 10ac via a session established with the communication PF β.

Note that although the communication PF is switched before the transmission terminal 10ac establishes communication using the communication PF α in the example of FIG. 7, in other examples, the communication PF may be switched after the transmission terminal 10ac joins the videoconference using the communication PF α.

FIG. 8 is a flowchart explaining the communication PF determination process of step S23 in greater detail. In FIG. 8, first, the communication state detection unit 55 of the transmission management system 50 checks the current number of sites (step S23-1). It can be determined from the start request information that the transmission terminal 10aa and the transmission terminal 10ac are participating in the same videoconference. Also, communication state detection unit 55 counts the transmission terminal 10ab that is already holding the videoconference with the transmission terminal 10aa based on the conference ID registered in the session management table. Thus, communication state detection unit 55 determines that the number of sites has increased to three sites.

Then, the PF switch determination unit 52 of the transmission management system 50 reads the threshold value (i.e., 3) from the PF determination table and determines whether the detected number of sites is 3 or more (step S23-2).

If a positive determination (YES) is made in step S23-2, the PF switch determination unit 52 decides to switch the communication PF to β (step S23-3). In the present example, the current communication PF is α, and as such the PF switch determination unit 52 has to switch the communication PF from α to β.

If a negative determination (NO) is made in step S23-2, the PF switch determination unit 52 decides to switch the communication PF to α (step S23-4). In the present example, the current communication PF is α, and as such the PF switch determination unit 52 would not have to do anything.

As described above, when a communication state change occurs while a videoconference is in session, the transmission system 1 of the present embodiment switches the communication PF to another communication PF that is determined to be optimal based on settings that are set up in advance. By switching the communication PF to another communication PF and continuing the videoconference using the other communication PF, the stability, quality, and cost-efficiency of the videoconference may be improved, for example.

Note that in the above example, a case where the number of sites is increased has been described as an illustrative example. However, the communication PF may also be switched when the number of sites is reduced. For example, when the session management unit 54 detects a change in the operation state of a transmission terminal 10 from "online" to "offline" such that the number of sites decreases from 3 or more to 2 or less, the PF switch determination unit 52 may switch the communication PF from β to α. In this case, the session management unit 54 may establish a session using the communication PF α, and the two transmission terminals 10 may continue the videoconference using the communications PF α.

Also, note that in the above-described example, the communication PF is switched in response to a change in the communication state; however, in other examples, the communication PF may be switched in response to a user request.

Also, in some embodiments, the transmission terminal 10 may include the PF determination table and the PF switch determination unit 52, and the transmission terminal 10 may determine whether to switch the communication PF. In this case, the transmission terminal 10 may monitor an increase/decrease in the number of sites on its own, or the transmission management system 50 may provide determination factors to the transmission terminal 10 for determining whether to switch the communication PF. For example, in the communication PF that does not involve data transmission via the relay device 30, the transmission management system 50 does not need to be aware of the communication PF being used. Thus, by having the transmission terminal 10 determine whether to switch the communication PF independently, the PF switch determination may be made only through communication between the transmission terminals 10.

Example 2

According to a second embodiment of the present invention, the transmission system 1 switches the communication PF using another PF determination table that is different from the PF determination table used in the first embodiment.

FIG. 9 is a block diagram illustrating exemplary functional configurations of the transmission terminal 10 and the transmission management system 50. In the description of the present embodiment, components and features that are identical to those of the first embodiment are given the same reference numerals, and overlapping descriptions thereof may be omitted.

The nonvolatile storage unit 5000 of the transmission management system 50 according to the present embodiment includes a relay device management DB 5006.

TABLE 7

(RELAY DEVICE MANAGEMENT TABLE)

| RELAY DEVICE ID | OPERATION STATE | RECEPTION DATE/TIME | RELAY DEVICE IP ADDRESS | FRAME RATE | RESOLUTION |
|---|---|---|---|---|---|
| 111a | ONLINE | 2013.02.10.13:42 | 1.2.1.2 | 30 fps | 1280 × 1024 |
| 111b | ONLINE | 2013.02.11.12:05 | 1.2.2.2 | 60 fps | 1920 × 1080 |
| 111c | OFFLINE | 2013.02.10.17:33 | 1.3.1.2 | 60 fps | 640 × 480 |
| 111d | ONLINE | 2013.02.10.09:02 | 1.3.2.2 | 15 fps | 640 × 480 |

A relay device management table as illustrated in the above Table 7 is stored in the relay device management DB 5006 of the nonvolatile storage unit 5000 according to the present embodiment. The relay device management table stores and manages, with respect to each relay device ID of each relay device 30, the operation state of the relay device 30, the reception date/time when state information indicating the operation state has been received at the transmission management system 50, the IP address of the relay device 30, the frame rate of the relay device 30, and the resolution in association with each other. For example, according to the relay apparatus management table shown in Table 7, with respect to a relay device 30a with the relay device ID "111a", the operation state of the relay device 30a is "online", the reception date/time when the above state information has been received by the transmission management system 50 is "2013.02.10.13.42" (Feb. 10, 2013 at 13:42), the IP address of the relay device 30a is "1.2.1.2", the frame rate of the relay device 30 is "30 fps", and the resolution is "1280×1024".

In some embodiments, compression methods supported by the relay device 30 may be registered in the relay device management table in addition to the above information items. For example, with H.264/AVC, the relay device 30 has to compress video for each individual transmission terminal 10 according to the communication band, the resolution, and the frame rate of the transmission terminal 10. Thus, in this case, although the relay device 30 can relay optimal video data to each transmission terminal 10, the load of the relay device 30 may be increased when the number of transmission terminals 10 is increased. On the other hand, with H.264/SVC, the relay device 30 may only have to relay a single type of content data, and the transmission terminal 10 at the receiving side reproduces the content data at a suitable resolution and frame rate according to the communication band, resolution, and frame rate of the transmission terminal 10. Thus, by registering the compression method supported by the relay device 30 in the relay device management table, the PF switch determination unit 52 may be able to select a relay device 30 supporting H.264/AVC or a relay device 30 supporting H.264/SVC according to the number of sites and the communication band, for example. In this way, efficient relaying of data may be enabled.

TABLE 8

(PF DETERMINATION TABLE)

| NETWORK | COMMUNICATION PLATFORM |
|---|---|
| ALL SITES WITHIN INTRANET | γ (VIA IN-HOUSE RELAY DEVICE) |
| OTHER | δ (HIGH-QUALITY COMMUNICATION) |

Also, the PF determination management DB 5005 of the nonvolatile storage unit 5000 according to the present embodiment stores a PF determination table as shown in the above Table 8. The PF determination table according to the present embodiment stores and manages a communication PF in association with a communication state relating to whether participating sites (transmission terminals 10) are all connected to an intranet. In the present embodiment, a communication PF γ refers to communication using a relay device 30 within the intranet (within an organization), and a communication PF δ refers to high-quality communication. Note that when all sites are connected to the intranet, there may be relatively little transmission delay, and as such, WebRCT may be used as the communication PF γ.

In the following, determination process steps of the PF switch determination unit 52 according to the present embodiment are described with reference to FIG. 10. FIG. 10 is a flowchart illustrating exemplary process steps implemented by the PF switch determination unit 52 for switching the communication PF based on the PF determination table. The process of FIG. 10 may be executed immediately after a videoconference is started or when a site is added or removed, for example. Note that the transmission management system 50 is connected to an external network as shown in FIG. 2.

According to FIG. 10, first, in step S41, the communication state detection unit 55 of the transmission management system 50 reads the IP address of each transmission terminal 10 participating in the videoconference from the terminal management table, and the PF switch determination unit 52 compares the IP addresses of the transmission terminals 10. Note that the IP address is a global IP address. Communication from within an organization to the external side involves passing through a proxy server or a firewall, and transmission terminals 10 connected to the same intranet have the same global IP address. Thus, the PF switch determination unit 52 may compare the IP addresses of the transmission terminals 10 to determine whether they are the same. Alternatively, assuming that one organization may have multiple global IP addresses, the PF switch determination unit 52 may query a DNS server to determine whether the IP addresses have the same domain name, for example.

In step S42, the PF switch determination unit 52 determines whether all of the sites are connected to the same intranet based on the comparison result.

Then, if a positive determination (YES) is made in step S42, the PF switch determination unit 52 decides to switch the communication PF to γ in step S43 based on the PF determination table.

If a negative determination (NO) is made in step S42, the PF switch determination unit 52 decides to switch the communication PF to δ in step S44.

In the case of switching the communication PF to γ, the session management unit 54 selects a relay device 30 within the intranet to which the sites (transmission terminals 10) are connected from the relay device management table. For example, the session management unit 54 may select a relay device 30 having the same IP address as the transmission terminals 10. Note that processes following the above process may be similar to the processes for switching the communication PF to β as described above. That is, the session management unit 54 transmits a communication PF switch command and the IP address of the selected relay device 30 to each transmission terminal 10. In turn the transmission terminal 10 establishes communication with the relay device 30 using a γ function unit 11c and the transmitting/receiving unit 11. In this way, the contents of the videoconference may be prevented from leaking outside such that security of the videoconference may be improved, for example.

In the case of switching the communication PF to δ, the session management section 54 refers to the relay apparatus management table to check the frame rate and the resolution of the relay devices 30, and selects the relay device 30 that can transmit content data at the highest quality level. Then, the session management unit 54 transmits a communication PF switch command and the IP address of the selected relay device 30 to each transmission terminal 10. In turn, the transmission terminal 10 established communication with the relay device 30 using a δ function unit 11d and the transmitting/receiving unit 11.

According to an aspect of the present embodiment, when a videoconference is held only between transmission terminals 10 that are connected to the same network, the communication PF γ (communication using a relay device 30 within the organization in the present embodiment) may be selected, and in this way, security may be improved. On the other hand, by selecting the communication PF δ, the quality of video and audio may be improved and communication lines may be efficiently used, for example.

Example 3

In the transmission system 1 according to a third embodiment of the present invention, the transmission terminal 10 is configured to notify the transmission management system 50 of a change in the communication state.

FIG. 11 is a block diagram illustrating exemplary functional configurations of the transmission terminal 10 and the transmission management system 50 according to the present embodiment. Note that in FIG. 11, components and features that are substantially identical to those illustrated in FIG. 9 are given the same reference numerals, and overlapping descriptions thereof may be omitted.

The transmission terminal 10 according to the present embodiment includes a state change notification unit 18. The state change notification unit 18 is implemented by the network I/F 111 and an instruction from the CPU 101 of FIG. 3. The state change notification unit 18 is configured to notify the transmission management system 50 of a change in the communication state such as a change in the communication band.

Also, the PF determination management DB 5005 according to the present embodiment stores a PF determination table as illustrated below, for example.

TABLE 9

(PF DETERMINATION TABLE)

| COMMUNICATION BAND | COMMUNICATION PLATFORM |
| --- | --- |
| THERE IS AT LEAST ONE TRANSMISSION TERMINAL WITH A COMMUNICATION BAND LESS THAN OR EQUAL TO 1 Mbps | β (VIA RELAY DEVICE) |
| OTHER | δ (HIGH-QUALITY COMMUNICATION) |

The PF determination management DB 5005 of the nonvolatile storage unit 5000 according to the present embodiment stores a PF determination table as illustrated in the above Table 9. The PF determination table according to the present embodiment stores and manages a communication PF in association with a communication state relating to whether at least one transmission terminal with a communication band that is less than or equal to a predetermined value (e.g., 1 Mbps) is included. In the present embodiment, the communication PF β refers to communication using a relay device 30 selected by the default selection method, and the communication PF δ refers to high-quality communication.

According to an aspect of the present embodiment, the communication PF may be dynamically switched based on the communication quality of the transmission terminals 10.

In the following, a process of switching the communication PF according to the present embodiment is described with reference to FIG. 12. FIG. 12 is a sequence chart illustrating exemplary process steps for switching the communication PF according to the present embodiment. In the present example, it is assumed that the transmission terminals 10aa and 10ab are communicating with each other using the communication PF δ.

Step S51: The state change notification unit 18 of the transmission terminal 10aa sends a state change notification to the transmission management system 50 when a communication state change occurs. In turn, the communication state detection unit 55 of the transmission management system 50 acquires the state change notification. In the present example, it is assumed that a change in the communication band has been detected, and the state change notification includes the communication band after the communication state change.

Step S52: Upon acquiring the state change notification, the PF switch determination unit 52 of the transmission management system 50 determines whether to switch the communication PF. That is, the PF switch determination unit 52 refers to the PF determination table and determines the communication PF to be used based on the communication band of the transmission terminal 10aa. In the present example, it is assumed that the communication band of the transmission terminal 10aa has decreased to be 1 Mbps or lower, and as such, the PF switch determination unit 52 determines the communication PF has to be switched to β.

Step S53: If the relay device 30 is changed according to the default selection method, the session management unit 54 updates the session management table. That is, the session management unit 54 selects the relay device 30 according to the default selection method, and updates the communication PF and the relay device ID registered in the session management table. Note that in the present example, no changes are made to the requesting terminal ID, the counterpart terminal ID, and the conference ID in the session management table. Also, the session ID may or may not be changed.

Step S54: The session management unit 54 sends a relay start request to the selected relay device along with the communication IDs of the transmission terminals 10aa and 10ab. In this way, the relay device 30 may be able to relay content data to the transmission terminals 10aa and 10ab that are participating in one videoconference.

Steps S55 and S56: The PF switch determination unit 52 of the transmission management system 50 sends communication PF switch commands to the transmission terminals 10aa and 10ab.

Steps S57 and S58: The PF switch determination unit 52 of the transmission management system 50 notifies the transmission terminals 10aa and 10ab of the IP address of the relay device 30. In this way, the transmission terminals 10aa and 10ab may be able to transmit content data to the relay device 30 that has been newly selected after the communication state change.

Steps S59 and S60: The transmission terminal 10aa switches the communication PF, and the transmission terminal 10ab switches the communication PF. That is, the transmission terminals 10aa and 10ab switch from communication using the δ function unit 11d and the transmitting/receiving unit 11 to communication using the β function unit 11b and the transmitting/receiving unit 11.

Thus, according to the present embodiment, the transmission management system 50 may be able to switch the communication PF in response to receiving a state change notification from the transmission terminal 10.

Note that other examples of a change in the communication state that may be notified by the transmission terminal include a decrease in sound level, a delay in video, and the like.

Example 4

In the transmission system 1 according to a fourth embodiment of the present invention, communication PFs are registered in association with a plurality of conditions. In the following descriptions, it is assumed that the transmission system 1 according to the present embodiment has a functional configuration identical to that illustrated in FIG. 11.

TABLE 10

(PF DETERMINATION TABLE)

| | CONDITION | COMMUNICATION PLATFORM |
|---|---|---|
| 1 | ALL SITES CONNECTED TO INTRANET AND MORE THAN 3 SITES | α (WebRTC, HIGH RATE) |
| 2 | 1 NOT SATISFIED AND AVAILABLE BAND IS AT LEAST 5 Mbps | δ (HIGH RATE, HIGH RESOLUTION) |
| 3 | 2 NOT SATISFIED AND THERE IS A TRANSMISSION TERMINAL USING A MOBILE COMMUNICATION NETWORK | ε (LOW QUALITY) |
| 4 | 3 NOT SATISFIED AND A TRANSMISSION TERMINAL NOT LISTED IN COUNTERPART LIST IS INCLUDED | ζ (WebRTC, LOW RATE) |

TABLE 10-continued (PF DETERMINATION TABLE)

| | CONDITION | COMMUNICATION PLATFORM |
|---|---|---|
| 5 | 4 NOT SATISFIED AND ALL TRANSMISSION TERMINALS ARE CONNECTED BY CABLE | η (HIGH RATE, LOW TO MIDDLE RESOLUTION) |
| 6 | OTHER | β |

The nonvolatile storage unit 5000 according to the present embodiment has a PF determination table as illustrated in the above Table 10 stored in the PF determination management DB 5005. In the PF determination table stores and manages communication PFs in association with six conditions.

Conditions 1 includes a condition restricting the number of sites to a small number and is associated with the communication PF α corresponding to high-rate communication using WebRTC. Condition 2 includes a condition requiring a relatively large available band and is associated with the communication PF δ corresponding to high-rate and high-resolution communication. Condition 3 includes a condition that a mobile communication network is utilized and is associated with a communication PF ε corresponding to low-quality communication such that accommodations may be easily made in response to variations in the communication band. Condition 4 includes a condition that a transmission terminal not included in the counterpart list of another transmission terminal is included. Such condition is associated with a communication PF ζ corresponding to low-rate communication using WebRTC. Condition 5 includes a condition that all the transmission terminals 10 be connected by cable (wired connection) and is associated with a communication PF η corresponding to high-rate and low/middle-resolution communication.

In the following, the above conditions are described further. With respect to condition 1, in the case where all participating sites are connected to the same intranet, delay can presumably be minimized, and if the number of sites is relatively small, communication with little stress may be realized even if WebRTC is used. With respect to condition 2, the condition that the available band be large is satisfied when all of the transmission terminals 10 meets the above condition. Note that the available band of the transmission terminal 10 may be determined by the transmission terminal 10 and notified to the transmission management system 50, or the transmission management system 50 may be configured to determine the available band.

With respect to condition 3, the transmission terminal 10 or the mobile terminal 20 may be configured to determine and notify the transmission management system 50 as to whether it is connected to a mobile communication network. The transmission terminal 10 or the mobile terminal 20 may be able to make such a determination based on the type identification information of the transmission terminal 10 or the OS of the mobile terminal 20, for example.

With respect to condition 4, the transmission management system 50 of the present embodiment may not be able to notify the relevant transmission terminals 10 of the state information of a transmission terminal 10 that is not listed in the counterpart list (as illustrated by steps S5 and S6 of FIG. 6). For example, it is assumed below that the transmission terminals 10aa and 10ab are each registered in the counterpart list of the other, and the transmission terminals 10ab and 10ac are each registered in the counterpart list of the other. In this case, the transmission terminal 10ab and the transmission terminal 10aa can communicate with each other, and the transmission terminal 10ab and the transmission terminal 10ac can communicate with each other. However, the transmission terminals 10aa and 10ac cannot communicate with each other because the transmission terminals 10aa and 10ac are not registered in the counterpart list of each other. In this respect, condition 4 corresponds to a condition for enabling videoconferencing between the transmission terminals 10aa, 10ab, and 10ac by enabling communication using WebRTC between the transmission terminals 10aa and 10ac in view of the ability of the transmission terminal 10ab to communicate with the transmission terminals 10aa and 10ac. The transmission management system 50 determines that condition 4 is satisfied if there is a common transmission terminal 10 in two videoconferences. If condition 4 is satisfied, the transmission management system 50 may query the transmission terminal 10ab about whether to switch the communication PF, or the user of the transmission terminal 10ab may request for a switch of the communication PF. When switching the communication PF, the session management unit 54 may transmit to each of the transmission terminals 10aa, 10ab, and 10ac the global IP addresses and port numbers of the other two sites.

With respect to condition 5 relating to whether all terminals are connected by cable (wired connection), the transmission terminal 10 or the mobile terminal 20 is preferably configured to notify the transmission management system 50 of its connection state. Note that when the mobile terminal 20 is connected to the transmission management system 50, it can be determined that the connection is not a wired connection.

In the following, a determination process of the PF switch determination unit 52 according to the present embodiment is described with reference to FIG. 13. FIG. 13 is a flowchart illustrating exemplary process steps implemented by the PF switch determination unit 52 for switching the communication PF based on the PF determination table. The process of FIG. 13 may be executed at the start of a videoconference or when the communication state detection unit 55 detects a communication state change that may affect a determination of whether to switch the communication PF (e.g., addition/removal of a site, or a change in the communication band). According to the process of FIG. 13, the communication PF associated with the condition that is determined to be satisfied at the earliest point is selected.

First, in step S71, the PF switch determination unit 52 of the transmission management system 50 determines whether condition 1 is satisfied.

If a positive determination (YES) is made in step S71, the PF switch determination unit 52 decides to switch the communication PF to α in step S720.

If a negative determination (NO) is made in step S71, the PF switch determination unit 52 determines whether condition 2 is satisfied in step S73.

If a positive determination (YES) is made in step S73, the PF switch determination unit 52 decides to switch the communication PF to δ in step S74.

If a negative determination (NO) is made in step S73, the PF switch determination unit 52 determines whether condition 3 is satisfied in step S75.

If a positive determination (YES) is made in step S75, the PF switch determination unit 52 decides to switch the communication PF to ε in step S76.

If a negative determination (NO) is made in step S75, the PF switch determination unit 52 determines whether condition 4 is satisfied in step 77.

If a positive determination (YES) is made in step S77, the PF switch determination unit 52 decides to switch the communication PF to ζ in step S78.

If a negative determination (NO) is made in step S77, the PF switch determination unit 52 determines whether condition 5 is satisfied in step S79.

If a positive determination (YES) is made in step S79, the PF switch determination unit 52 decides to switch the communication PF to η in step S80.

If a negative determination (NO) is made in step S79, the PF switch determination unit 52 decides to switch the communication PF to β in step S81.

As can be appreciated from the above, in the transmission system 1 according to the present embodiment even when three or more conditions are registered in the PF determination table, an appropriate communication PF may be determined by performing determination processes in a pre-designated order.

Example 5

In the transmission system 1 according to a fifth embodiment of the present invention, switching of the communication PF may be restricted as described below.

FIG. 14 is a block diagram illustrating exemplary functional configurations of the transmission terminal 10 and the transmission management system 50 according to the present embodiment. In FIG. 14, features and components that may be substantially identical to those illustrated in FIG. 11 are given the same reference numerals and overlapping descriptions thereof may be omitted.

TABLE 11

| (SWITCH RESTRICTION CONDITION TABLE) | | |
|---|---|---|
| | RESTRICTION TYPE | RESTRICTION |
| 1 | PLATFORM CHANGE PATTERN | δ → α NOT ALLOWED |
| 2 | NUMBER OF TIMES | UP TO 3 TIMES PER CONFERENCE |
| 3 | ELAPSED TIME FROM LAST CHANGE | AT LEAST 60 SECONDS |

The nonvolatile storage unit 5000 according to the present embodiment includes a switch restriction condition management DB 5007 storing a switch restriction condition table as illustrated in the above Table 11. This switch restriction condition table registers restriction conditions that would disable switching of the communication PF even when a condition for switching the communication PF described in the PF determination table is satisfied.

Note that switching the communication PF while users are holding a videoconference may enable more effective communication in the long run. However, in the short term, inconveniences may arise such as the need to update the screen layout and short disruptions in communication, for example. Thus, according to an aspect of the present embodiment, certain restrictions may be imposed to prevent frequent switching of the communication PF (e.g., restrictions 2 and 3 of the above switch restriction condition table) and/or prevent switching of the communications PF when a substantial impact is not expected from the switch (e.g., restriction 1 of the above switch restriction condition table).

In the following, a switch restriction determination process based on the switch restriction condition table according to the present embodiment is described with reference to FIG. 15. FIG. 15 is a flowchart illustrating exemplary process steps implemented by the PF switch determination unit 52 for switching the communication PF based on the PF determination table and the switch restriction condition table according to the present embodiment. Note that the process of FIG. 15 may be executed in conjunction with the PF switch determination processes according to the first through fourth embodiments, for example.

In step S91, the PF switch determination unit 52 determines whether a PF switch condition of the PF determination table is satisfied. If a negative determination (NO) is made in step S91, the process is terminated without referring to the switch restriction condition table.

If a positive determination (YES) is made in step S91, the PF switch determination unit 52 determines whether the restriction conditions of the switch restriction condition table are not satisfied in step S92.

If a positive determination (YES) is made in step S92, this means that switching the communication PF is allowed, and the PF switch determination unit 52 can decide to switch the communication PF in step S93.

If a negative determination (NO) is made in step S92, this means that switching of the communication PF is not allowed, and as such the PF switch determination unit 52 decides not to switch the communication PF in step S94.

As can be appreciated from the above, according to an aspect of the present embodiment, the communication PF may be switched only if switching the communication PF may have sufficiently advantageous effects, for example.

<<Accommodating Multiple Communication PFs>>

In a case where the transmission system 1 supports many types of communication PFs, a large number of restrictions (e.g., restriction type 1 of Table 11) may have to be registered in the switch restriction condition table as illustrated in Table 11. That is, when there are many types of communication PFs, the number of restrictions relating to switching between the these communication PFs increases accordingly. Also, when there is a discrepancy or error in the switch restriction condition table such that the communication PF to be used after switching is unavailable, for example, an additional restriction may have to be added to the switch restriction condition table.

In view of the above, in some embodiments, a PF determination table as illustrated in Table 12 below may be used.

TABLE 12

(PF DETERMINATION TABLE)

| CURRENT PLATFORM | SWITCH CONDITION | PLATFORM AFTER SWITCH |
|---|---|---|
| α | 3 OR MORE SITES | β |
| α | PARTICIPATION FROM MOBILE COMMUNICATION NETWORK | ε |
| γ | PARTICIPATION FROM EXTERNAL NETWORK | δ |
| γ | PARTICIPATION FROM FOREIGN COUNTRY | θ |
| ... | ... | ... |

The above Table 12 illustrates another example of a PF determination table. In the PF determination table as illustrated in Table 12, a switch condition and a communication PF after switching are registered in association with a current communication PF. That is, the PF switch determination unit 52 uses the current communication PF as a key and decides to switch the communication PF to the corresponding communication PF after switching upon determining that the corresponding switch condition is satisfied. The PF switch determination unit 52 may scan the PF determination table from the top to find the current communication PF and the corresponding switch condition. The PF switch determination unit 52 may thus decide to switch the communication PF only when the corresponding switch condition for the current communication PF is satisfied. In this way, enlargement of the switch restriction condition table may be prevented. Note that the switch restriction condition table is an example of restriction information.

Example 6

In the transmission system 1 according to a sixth embodiment of the present embodiment, each user uses a different PF determination table to perform a switch determination process for switching the communications PF as described below.

In the above-described first through third embodiments, the transmission management system 50 manages the PF determination table. However, some users may wish to apply different PF switch conditions. To accommodate such individual preferences of users, each transmission terminal 10 may manage its own PF determination table, or the transmission management system 50 may store and manage a PF determination table in association with the communication ID of each transmission terminal 10 (e.g., the transmission terminal 10 may acquire its corresponding PF determination table from the transmission management system 50 at login time). By having each transmission terminal 10 determine whether to switch the communication PF using its own PF determination table, each user may be able to apply different switch conditions, for example.

However, in the above case, the transmission terminals 10 communicating with each other may not always decide to switch to the same communication PF occurs.

Thus, the present embodiment addresses such a problem by determining whether to switch the communication PF to a particular communication PF by a majority decision method.

FIG. 16 is a block diagram illustrating exemplary functional configurations of the transmission terminal 10 and the transmission management system 50 according to the present embodiment. In FIG. 16, features and components that are substantially identical to those illustrated in FIG. 14 are given the same reference numerals and overlapping descriptions thereon may be omitted.

In the present embodiment, the transmission terminal 10 includes the PF switch determination unit 52. Note that features and functions of the PF switch determination unit 52 according to the present embodiment may be substantially identical to those of the first through fifth embodiments. Also, the nonvolatile storage unit 1000 of the transmission terminal 10 according to the present embodiment includes the PF determination management DB 5005 storing a PF determination table. Note that the contents of the PF determination table according to the present embodiment may be substantially identical to those of the first through third embodiments.

Further, the transmission management system 50 according to the present embodiment includes a majority decision unit 56. The majority decision unit 56 may be implemented by an instruction from the CPU 301 of FIG. 4. The majority decision unit 56 determines whether to switch the communication PF by majority decision when the transmission management system 50 receives a request for switching the communication PF (switch request) from one or more transmission terminals 10.

FIG. 17 is a sequence chart illustrating exemplary process steps implemented by the transmission management system 50 for determining whether to switch the communication PF. Note that in the present example, it is assumed that the transmission terminals 10aa, 10ab, and 10ac are currently holding a videoconference using the communication PF α.

Step S101: The state change notification unit 18 of the transmission terminal 10aa detects some type of change in the communication state. For example, the state change notification unit 18 may detect a change in the communication band or a change in the number of sites.

Step S102: The PF switch determination unit 52 of the transmission terminal 10aa refers to its own PF determination table and decides to switch the communication PF to β. Accordingly, the transmitting/receiving unit 11 sends a switch request to the transmission management system 50 for switching the communication PF to β.

Step S103: The majority decision unit 56 of the transmission management system 50 determines whether to switch the communication PF. At this point, the transmission terminals 10ab and 10ac have not made switch requests to change the communication PF, and as such, majority decision unit 56 decides not to switch the communication PF.

Step S104: Then, the state change notification unit 18 of the transmission terminal 10ab detects some type of change in the communication state. For example, the state change notification unit 18 may detect a change in the communication band or a change in the number of sites.

Step S105: The PF switch determination unit 52 of the transmission terminal 10ab refers to its own PF determination table and decides to switch the communication PF to γ. Accordingly, the transmitting/receiving unit 11 sends a switch request to the transmission management system 50 for switching the communication PF to γ.

Step S106: The majority decision unit 56 of the transmission management system 50 determines whether to switch the communication PF. At this point, only one switch request for switching the communication PF to γ has been received, and as such, the majority decision unit 56 decides not to switch the communication PF.

Step S107: Then, the state change notification unit 18 of the transmission terminal 10ac detects some type of change in the communication state. For example, the state change notification unit 18 may detect a change in the communication band or a change in the number of sites.

Step S108: The PF switch determination unit 52 of the transmission terminal 10ac refers to its own PF determination table and decides to switch the communication PF to β. Accordingly, the transmitting/receiving unit 11 sends a switch request to the transmission management system 50 for switching the communication PF to β.

Step S109: The majority decision unit 56 of the transmission management system 50 determines that two switch requests for switching the communication PF to β have been received from two terminals, which constitutes a majority of the total number of terminals holding the videoconference, and as such, the majority decision unit 56 decides to switch the communication PF to β.

Steps S110-S112: The majority decision unit 56 of the transmission management system 50 sends switch commands for switching the communication PF to β to the transmission terminals 10aa, 10ab, and 10ac.

In this way, the transmission terminals 10aa, 10ab, and 10ac will be able to switch the communication PF to β and continue the videoconference.

As can be appreciated from the above, according to an aspect of the present embodiment, each user (transmission terminal 10) may be able to make a switch request for switching the communication PF to a desired communication PF using a different PF determination table, and the communication PF may be switched to a communication PF designated in a majority of the switch requests issued by a majority of users (transmission terminals 10).

Note that in some embodiments, instead of using the majority decision method as described above, a switch request from the host/organizer of the videoconference may be prioritized, for example. In other embodiments, an order of priority may be assigned to the communication PFs, and the communication PF may be switched to a communication PF with the highest priority among the communication PFs designated in the switch requests from the users, for example.

Although the present invention has been described above with respect to certain illustrative embodiments, the present invention is not limited to these embodiments, and numerous variations and modifications may be made without departing from the scope of the present invention.

The present application is based on and claims the benefit of priority of Japanese Patent Application No. 2015-048223 filed on Mar. 11, 2015, the entire contents of which are hereby incorporated by reference.

REFERENCE SIGNS LIST

1: transmission system
2: communication network
10: transmission terminal
18: state change notification unit
30: relay device
50: transmission management system
52: PF switch determination unit
55: communication state detection unit

The invention claimed is:

1. An information processing apparatus that interconnects a plurality of transmission terminals supporting a plurality of communication platforms, the information processing apparatus comprising:
processing circuitry configured to
detect a communication state relating to at least one of a communication between the transmission terminals and a communication between at least one of the transmission terminals and the information processing apparatus; and
determine that a communication platform of the plurality of communication platforms that is registered in stored communication platform determination information in association with the communication state that has been detected is to be used in the communication between the transmission terminals, the stored communication platform determination information associating the plurality of communication platforms with a corresponding communication state,
wherein the processing circuitry is further configured to acquire a plurality of communication platform switch requests from a plurality of the transmission terminals; and
wherein the processing circuitry is further configured to decide to switch to a majority communication platform that is designated in at least a majority number of the communication platform switch requests that has been acquired from the plurality of the transmission terminals, the majority number exceeding half of a total number of the transmission terminals that are communicating with each other.

2. The information processing apparatus according to claim 1, wherein the processing circuitry is further configured to
acquire the communication state from at least one of the transmission terminals; and
determine that the communication platform of the plurality of communication platforms that is registered in the stored communication platform determination information in association with the communication state that has been acquired from the at least one of the transmission terminals is to be used in the communication between the transmission terminals.

3. The information processing apparatus according to claim 1, further comprising:
a memory to store restriction information for restricting communication platform switching,
wherein:
the processing circuitry is further configured to read, from the memory, the restriction information for restricting communication platform switching; and
even when the processing circuitry determines that the communication platform to be used should be switched based on the stored communication platform determination information, the processing circuitry is configured to refrain from switching the communication platform to be used upon determining that communication platform switching is restricted by the restriction information.

4. The information processing apparatus according to claim 1, wherein
the stored communication platform determination information associates the plurality of communication platforms with a number of the transmission terminals communicating with each other; and
the processing circuitry is further configured to determine that a corresponding communication platform of the plurality of communication platforms that is registered in the stored communication platform determination information in association with the number of the transmission terminals communicating with each other that has been detected is to be used in the communication between the transmission terminals.

5. The information processing apparatus according to claim 1, wherein
the stored communication platform determination information associates the plurality of communication platforms with whether all of the transmission terminals communicating with each other are connected to an intranet; and
when the processing circuitry determines that all of the transmission terminals are connected to the intranet, the processing circuitry is further configured to determine that a corresponding communication platform of the plurality of communication platforms that is registered in the stored communication platform determination information in association with a case where all of the transmission terminals communicating with each other are connected to the intranet is to be used in the communication between the transmission terminals.

6. The information processing apparatus according to claim 1, wherein
the stored communication platform determination information associates the plurality of communication platforms with a communication band; and
the processing circuitry is further configured to determine that a corresponding communication platform of the plurality of communication platforms that is registered in the stored communication platform determination information in association with the communication band that has been detected is to be used in the communication between the transmission terminals.

7. The information processing apparatus according to claim 1, wherein
the stored communication platform determination information associates the plurality of communication platforms with at least three communication states; and
the processing circuitry is further configured to determine whether the communication state that has been detected is registered in the stored communication platform determination information in a predetermined order, and identify a first communication platform of the plurality of communication platforms that is associated with a first communication state of the communication states that is first determined to correspond to the communication state that has been detected as the communication platform to be used in the communication between the transmission terminals.

8. The information processing apparatus according to claim 1, wherein
the stored communication platform determination information associates a current communication platform with a switch condition communication state and a post-switch communication platform; and
the processing circuitry is further configured to determine that the post-switch communication platform that is registered in the stored communication platform determination information in association with the current communication platform and the switch condition communication state corresponding to the communication state that has been detected is to be used in the communication between the transmission terminals.

9. The information processing apparatus according to claim 1, wherein
at least one of the plurality of communication platforms registered in the stored communication platform determination information is for establishing one-on-one communication between the transmission terminals, and at least another one of the plurality of communication platforms is for establishing communication between the transmission terminals via a relay device.

10. A communication platform switching method, comprising:
detecting a communication state relating to at least one of a communication between at least two of a plurality of transmission terminals communicating with each other and a communication between at least one of the transmission terminals and an information processing apparatus that interconnects the plurality of transmission terminals, which support a plurality of communication platforms; and
determining that a communication platform of the plurality of communication platforms that is registered in stored communication platform determination information in association with the communication state that has been detected is to be used in the communication between the transmission terminals communicating with each other, the stored communication platform determination information associating the plurality of communication platforms with a corresponding communication state, wherein the detecting step further comprises acquiring a plurality of communication platform switch requests from a plurality of the transmission terminals; and wherein the determining step further comprises deciding to switch to a majority communication platform that is designated in at least a majority number of the communication platform switch requests that has been acquired from the plurality of the transmission terminals, the majority number exceeding half of a total number of the transmission terminals that are communicating with each other, the communication platform switching method further comprising establishing communication using a communication method corresponding to a designated communication platform designated in a communication platform switch command, upon acquiring the communication platform switch command.

11. A transmission system, comprising:

a plurality of transmission terminals; and an information processing apparatus that interconnects the plurality of transmission terminals supporting a plurality of communication platforms, the information processing apparatus including:

processing circuitry configured to
  detect a communication state relating to at least one of a communication between the transmission terminals and a communication between at least one of the transmission terminals and the information processing apparatus; and
  determine that a communication platform of the plurality of communication platforms that is registered in stored communication platform determination information in association with the communication state that has been detected is to be used in the communication between the transmission terminals, the stored communication platform determination information associating the plurality of communication platforms with a corresponding communication state, wherein the processing circuitry is further configured to acquire a plurality of communication platform switch requests from a plurality of the transmission terminals; and wherein the processing circuitry is further configured to decide to switch to a majority communication platform that is designated in at least a majority number of the communication platform switch requests that has been acquired from the plurality of the transmission terminals, the majority number exceeding half of a total number of the transmission terminals that are communicating with each other.

* * * * *